(12) United States Patent
Nanaumi

(10) Patent No.: US 8,402,265 B2
(45) Date of Patent: Mar. 19, 2013

(54) IMAGE FORMING APPARATUS, IMAGE PROCESSING SYSTEM, METHOD FOR CONTROLLING IMAGE PROCESSING SYSTEM, AND STORAGE MEDIUM

(75) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/070,889

(22) Filed: Mar. 24, 2011

(65) Prior Publication Data

US 2011/0238981 A1 Sep. 29, 2011

(30) Foreign Application Priority Data

Mar. 25, 2010 (JP) ................. 2010-070320

(51) Int. Cl.
*H04L 29/06* (2006.01)

(52) U.S. Cl. ..................................... 713/155

(58) Field of Classification Search .................. 713/155, 713/164–166, 168, 189, 193
See application file for complete search history.

(56) References Cited

U.S. PATENT DOCUMENTS

| | | | |
|---|---|---|---|
| 6,785,809 B1 * | 8/2004 | Hardjono | 713/163 |
| 7,178,021 B1 * | 2/2007 | Hanna et al. | 713/155 |
| 7,349,974 B2 * | 3/2008 | Dias et al. | 709/229 |
| 7,774,366 B2 | 8/2010 | Fisher | |
| 2006/0206834 A1 | 9/2006 | Fisher | |
| 2007/0140483 A1 * | 6/2007 | Jin et al. | 380/44 |
| 2009/0060189 A1 * | 3/2009 | Osajima et al. | 380/259 |
| 2010/0299608 A1 | 11/2010 | Fisher | |

FOREIGN PATENT DOCUMENTS

| | | |
|---|---|---|
| JP | 2008-533593 T | 8/2008 |
| WO | 2006096792 A2 | 9/2006 |

* cited by examiner

*Primary Examiner* — Beemnet Dada
(74) *Attorney, Agent, or Firm* — Canon U.S.A., Inc. IP Division

(57) ABSTRACT

At an apparatus, a reading unit reads a document a generation unit and generates a content data from the document and an encryption unit performs encryption processing on the content data using an encryption key and a transmission unit, when an instruction for not using a service for performing processing on the content data provided by a server group and for storing the generated content data in the server group is received, transmits to the server group the content data on which the encryption processing has been performed, and, when an instruction for using the service is received, transmits to the server group the content data on which the encryption processing has not been performed.

19 Claims, 15 Drawing Sheets

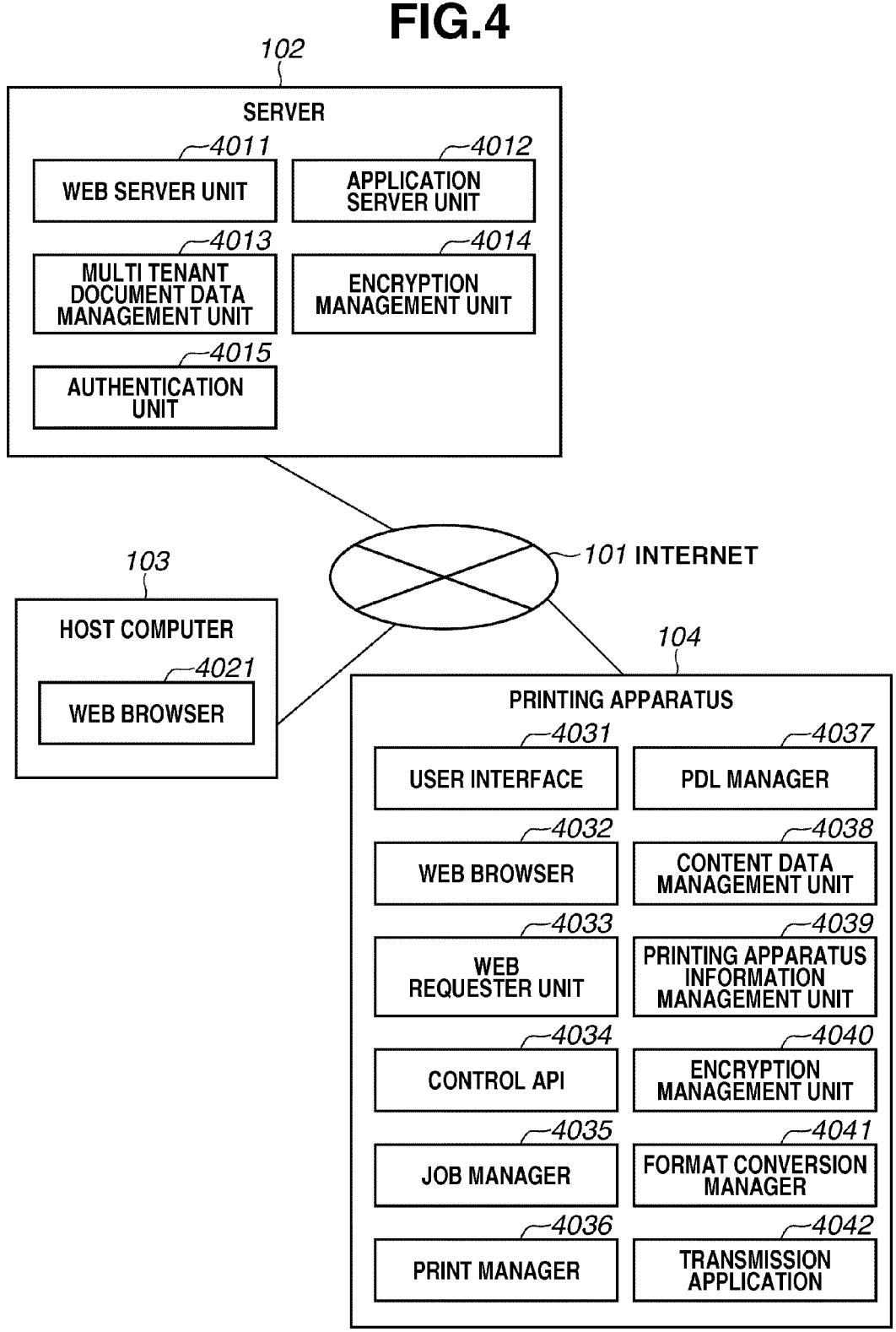

FIG.6A

DOCUMENT MANAGEMENT TABLE 601

| DOCUMENT ID | DOCUMENT NAME | ACCESS RIGHT INFORMATION | SECURITY TYPE INFORMATION | ENCRYPTION KEY IDENTIFICATION INFORMATION | REGISTERED DEVICE INFORMATION | CONTENT DATA |
|---|---|---|---|---|---|---|
| 602 | 603 | 604 | 605 | 606 | 607 | 608 |
| 1 | Document | AAA | BBB | CCC | DDD | DATA |

FIG.6B

SECURITY TYPE INFORMATION 605

| SECURITY TYPE INFORMATION | ENCRYPTION METHOD | ENCRYPTION/ DECRYPTION LOCATION | GENERATED KEY |
|---|---|---|---|
| 609 PRINTING APPARATUS KEY | PUBLIC KEY ENCRYPTION | PRINTING APPARATUS | EACH PRINTING APPARATUS |
| 610 SERVER KEY | COMMON KEY ENCRYPTION | SERVER | EACH SERVER |
| 611 USER KEY | COMMON KEY ENCRYPTION | SERVER | EACH USER |

FIG.9

SECURITY TYPE DETERMINATION MAPPING TABLE 901

| SPECIFICATION RESULT | SECURITY TYPE INFORMATION |
|---|---|
| LOCAL & SHARE | PRINTING APPARATUS KEY |
| LOCAL & PERSONAL | PRINTING APPARATUS KEY |
| REMOTE & SHARE | SERVER KEY |
| REMOTE & PERSONAL | USER KEY |

902 — LOCAL & SHARE
903 — LOCAL & PERSONAL
904 — REMOTE & SHARE
905 — REMOTE & PERSONAL

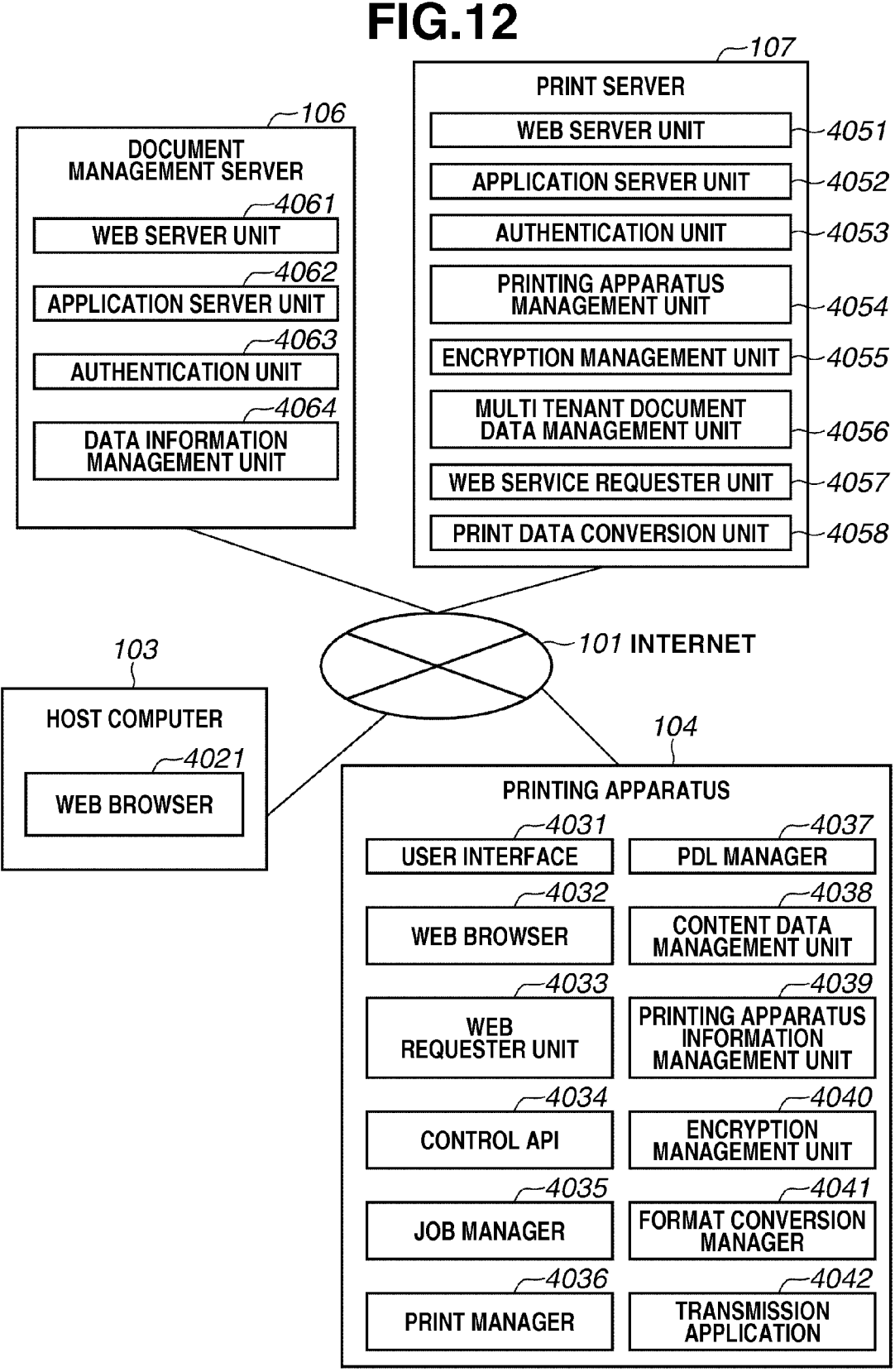

FIG.13A

PRINTING APPARATUS MANAGEMENT TABLE 1301

| PRINTING APPARATUS ID (1302) | PRINTING APPARATUS NAME (1303) | SECURITY FLAG (1304) | ENCRYPTION KEY (1305) | PRINTING APPARATUS CAPACITY INFORMATION (1306) |
|---|---|---|---|---|
| 1 | Document 1 | AAA | BBB | CCC |

FIG.13B

PRINT DATA MANAGEMENT TABLE 1311

| PRINT DATA ID (1312) | PRINT DATA NAME (1313) | CONTENT DATA ID (1314) | ACCESS RIGHT INFORMATION (1315) | SECURITY TYPE INFORMATION (1316) | ENCRYPTION KEY IDENTIFICATION INFORMATION (1317) | PRINT DATA (1318) |
|---|---|---|---|---|---|---|
| 1 | Document 1 | XXX | AAA | BBB | CCC | DDD |

FIG.13C

SECURITY TYPE INFORMATION 1321

| SECURITY TYPE INFORMATION | ENCRYPTION METHOD | ENCRYPTION LOCATION | DECRYPTION LOCATION |
|---|---|---|---|
| PRINTING APPARATUS KEY (1322) | PUBLIC KEY ENCRYPTION | PRINT SERVER | PRINTING APPARATUS |
| SERVER KEY (1323) | COMMON KEY ENCRYPTION | PRINT SERVER | SERVER |

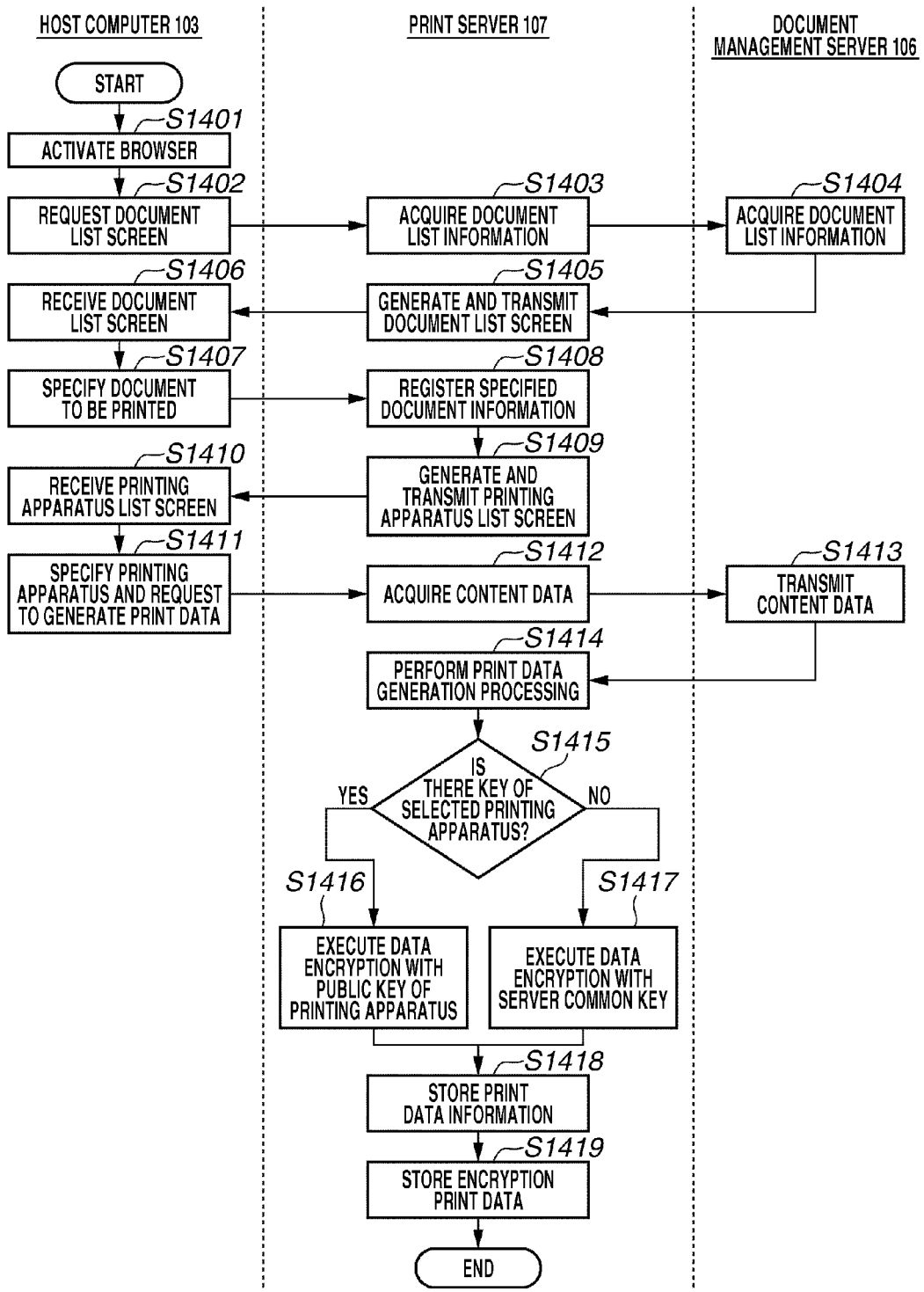

IMAGE FORMING APPARATUS, IMAGE PROCESSING SYSTEM, METHOD FOR CONTROLLING IMAGE PROCESSING SYSTEM, AND STORAGE MEDIUM

BACKGROUND OF THE INVENTION

1. Field of the Invention

The present invention relates to an image forming apparatus, an image processing system, a method for controlling the image processing system, and a storage medium.

2. Description of the Related Art

Content management systems using an internet technique have been widely used. A user accesses a server from a client computer via the Internet, and further accesses a web page provided by the server to operate a target content on the web page.

Particularly, in recent years, a form has become popular in which a server performs specific processing on data of the content. Such a form is referred to as a "software as a service (SaaS)", or "cloud computing". The server included in such a form provides the service for performing the specific processing on the content.

Japanese Patent Application Laid-Open No. 2002-287919 discusses a method in which a printer prints the content managed by a content management system. Further, Japanese Patent Application Laid-Open No. 2002-287919 discusses a method in which, when content data is transferred from the server to the printer, the server performs encryption processing on the content data using a public key.

Furthermore, when the printer receives the encrypted content data from the server, the printer decrypts the received content data using a secret key of the printer and then prints the target content. Even if the content data is illegally acquired from a communication pass by this method, since the data is encrypted, information thereof can be prevented from leakage.

Moreover, Japanese Unexamined Patent Application Publication (Translation of PCT Application) No. 2008-533593 discusses a control method for controlling the data in a multi tenant manner, particularly, a method for defining an area for publicizing the data. A data management form of the cloud computing can be performed by a multi tenant management as discussed in Japanese Unexamined Patent Application Publication (Translation of PCT Application) No. 2008-533593, and thus an unspecified number of users shares and uses a memory resource. More specifically, a memory of the cloud computing stores the data of an unspecified number of users.

The conventional technique may have an issue in which encryption processing cannot be performed according to a user's purpose for using the data. For example, when the server, as discussed in Japanese Patent Application Laid-Open No. 2002-287919, performs a specific processing on the data, if encryption processing has been performed on the data with a printer key, the server cannot perform the specific processing on the data.

However, as described above, considering possibility of data leakage, it is safer to perform the encryption processing on the data with the printer key. That is because, even if the third party illegally acquires the data, since the encryption processing has been performed on the data with the public key of the printer, as long as the secret key of the printer is not specified, decryption cannot be easily performed. As described above, the user has a desire for using the services provided by the server by using the form represented by the cloud computing and also for safely managing the data.

As another example, according to Japanese Unexamined Patent Application Publication (Translation of PCT Application) No. 2008-533593, since an unspecified number of users uses the same memory resource, it is highly possible for the data to be illegally acquired by the third party. On the other hand, it can be said that the data managed by such a server is placed in an environment in which a large number of users can easily share the data, and also a system in which nature of the cloud computing can be fully utilized.

As described above, the user has desires for sharing the data by using the server that manages the data in a multi tenant manner and also for safely managing the data.

SUMMARY OF THE INVENTION

According to an aspect of the present invention, an apparatus includes a reading unit configured to read a document, a generation unit configured to generate the content data from the document, an encryption unit configured to perform encryption processing on the content data using an encryption key, and a transmission unit configured to, when an instruction for not using the service for performing the processing on the content data provided by the server group and for storing the generated content data in the server group is received, transmit to the server group the content data on which the encryption processing has been performed, and, when an instruction for using the service is received, transmit to the server group the content data on which the encryption processing has not been performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a block diagram illustrating a software configuration of a server 102, a host computer 103, and a printing apparatus 104 according to the first exemplary embodiment.

FIG. 6A is a multi tenant document management table 601 of a server 102 according to the first exemplary embodiment.

FIG. 6B is a table illustrating security authentication information 605 according to the first exemplary embodiment.

FIG. 9 is a security type determination mapping table according to the first exemplary embodiment.

FIG. 12 is a block diagram illustrating a software configuration of a document management server 106, a print server 107, a host computer 103, and a printing apparatus 104 according to the second exemplary embodiment.

FIG. 13A illustrates a printing apparatus management table 1301 according to the second exemplary embodiment. FIG. 13B illustrates a print data management table 1311 according to the second exemplary embodiment. FIG. 13C is a table illustrating security authentication information 1321 according to the second exemplary embodiment.

FIG. 14 is a flowchart illustrating print data registration processing according to the second exemplary embodiment.

DESCRIPTION OF THE EMBODIMENTS

Various exemplary embodiments, features, and aspects of the invention will be described below in detail with reference to the drawings.

Figure 1:
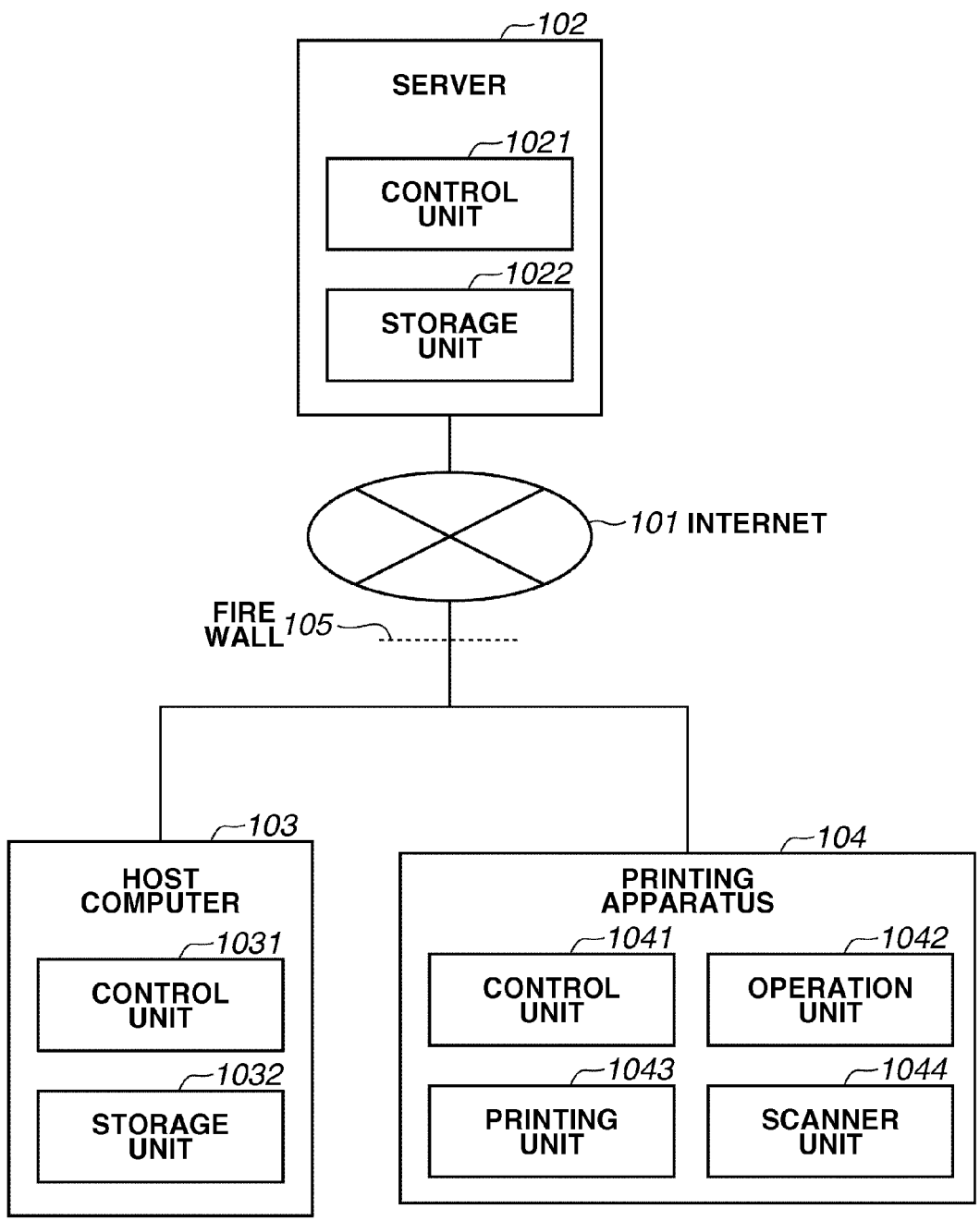
FIG. 1 is a block diagram illustrating a configuration of an image processing system according to a first exemplary embodiment.

A configuration of an image processing system according to a first exemplary embodiment will be described. FIG. 1 illustrates an entire configuration of a system according to the first exemplary embodiment. The system includes an internet 101, a server 102, a host computer 103, a printing apparatus 104, and a firewall 105.

The internet 101 functions as a communication line for mutually transmitting and receiving information among the server 102, the host computer 103, and the printing apparatus 104. Accordingly, a plurality of apparatuses described above can communicate with one another. The communication line may be a wired line or a wireless line.

The server 102 includes a control unit 1021 and a storage unit 1022. The storage unit 1022 stores content data such as document data and image data. The control unit 1021 performs generally known functions as an application server. More specifically, in addition to execute a program of a web application stored in the storage unit 1022, the control unit 1021 controls transmission and reception of the data to and from an external apparatus. As described above, the control unit 1021 controls various types of functions of the server 102.

The server 102 executes the web application (not illustrated) according to processing requests from a print unit 1043 of the host computer 103 and a web browser 4032 of the printing apparatus 104 that will be described below. The server 102 executes the web application to perform processing on the content data. As described above, the server 102 provides a service for performing the processing on the content data according to the processing request.

Details of the service will be described below. Further, the control unit 1021 of the server 102 performs data storage processing for storing the data in the storage unit 1022, display processing, print processing or image processing on the stored data.

An example is described where one server 102 provides the service in the first exemplary embodiment. However, as another embodiment of the server 102, a plurality of servers may be included and a plurality of virtual machines may be activated in the server group to perform distributed processing. In this case, a technique referred to as "scale out" (also referred to as "cloud computing") in which the number of virtual machines is increased according to a predetermined condition is used.

The host computer 103 includes the control unit 1021 and the storage unit 1022, is connected to the server 102 and the printing apparatus 104 via the internet 101, and thus can receive the provided services from various types of apparatuses. The control unit 1021 controls various types of functions of the host computer 103.

In addition to the application program performed by the host computer 103, the storage unit 1022 stores the content such as the data. The host computer 103 may be, for example, a personal computer (PC), a personal digital assistant (PDA), and a mobile phone.

The printing apparatus 104 is an image forming apparatus and further a multi function peripheral (MFP) for inputting and outputting, and transmitting and receiving the content data, and further performing various image processing. A control unit 1041 controls an operation unit 1042, the print unit 1043, and a scanner unit 1044 that are components included in the printing apparatus 104.

The operation unit 1042 includes the user interface to receive an instruction input by the user for operating the printing apparatus 104. The print unit 1043 is controlled by the control unit 1041, performs the various images processing on the content data, and further prints and outputs the content data to a recording medium.

The scanner unit 1044 is controlled by the control unit 1041 and inputs an image. More specifically, the scanner unit 1044 reads a document placed on a document stand of the printing apparatus 104 and transmits to the control unit 1041 the document image generated by reading the document.

The firewall 105 functions as a known firewall. Further, the firewall 105 functions as an apparatus for limiting access from the external apparatuses via the internet 101 to strengthen security of the host computer 103 and the printing apparatus 104. The firewall 105 may be realized in either form of hardware or software.

The services will be described here. The services include a print service and a scanning service. As an example, a print service will be described.

The print service is a service in which the server 102 converts the data to be printed corresponding to the print instruction from the user into the print data. The printing apparatus 104 prints the print data received from the server 102.

The user requesting the print service transmits an instruction for selecting the content to be printed to the server 102 via a web browser 4021 of the host computer 103 that will be described below. The server 102 that has received the selection instruction converts the data corresponding to the content into a format in which the printing apparatus 104 can print the data, i.e., into the print data. The server 102, then, transmits the print data to the printing apparatus 104.

The printing apparatus 104 prints the print data. Further, as one of other examples, a storage service will be described. The storage service is a service in which the server 102 stores the data to be stored according to a storage instruction from the user. An example of the data to be stored is the data input by the scanner unit 1044. As described above, by receiving the service provided by the server 102, the user can acquire the desired result.

It is also conceivable, when the print data is transmitted to the printing apparatus 104, the data is once transmitted to the host computer 103 and then transmitted from the host computer 103 to the printing apparatus 104. Further, when the server 102 has an IP address of the printing apparatus 104, the print data is directly transmitted thereto.

A system in which various types of apparatuses, for example, the server 102, the host computer 103, and the printing apparatus 104, are linked with one another is referred to as a device linkage system. The user can acquire the desired result by using the device linkage system (image processing system according to the first exemplary embodiment).

Next, hardware configurations of various types of apparatuses included in the image processing system according to the first exemplary embodiment will be described with reference to FIGS. 2 and 3.

Figure 2:
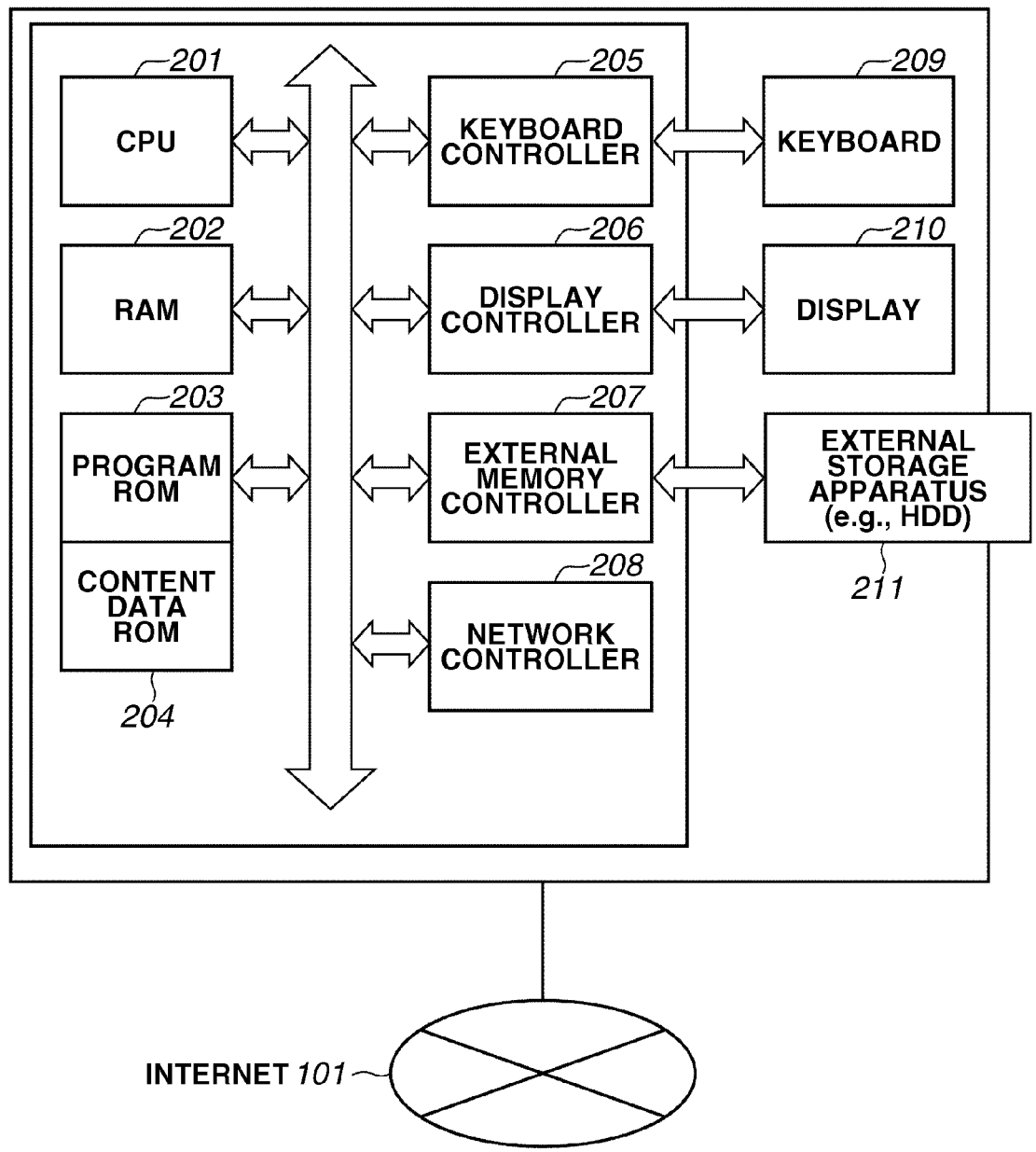
FIG. 2 is a block diagram illustrating a hardware configuration of a server 102 and a host computer 103 according to the first exemplary embodiment.

FIG. 2 illustrates a hardware configuration of the server 102 and the host computer 103. The hardware configuration diagram corresponds to that of a general information processing apparatus. The hardware configuration of the general information processing apparatus can be applied to the server 102 and the host computer 103 in the first exemplary embodiment.

A central processing unit (CPU) 201 loads into a random access memory (RAM) 202 programs stored in a read only memory (ROM) 203 or an external storage apparatus 211 and executes the program. The programs include the programs of an operating system (OS) and applications.

The control unit 1021 and the control unit 1031 described above can be realized when the CPU 201 executes the programs. Each processing of the flowchart discussed in the first exemplary embodiment can be realized when the CPU 201 executes the programs.

The RAM 202 is a main memory of the CPU 201 and functions as a working area. A keyboard controller 205 controls key input from a keyboard 209 and a pointing device (not illustrated). A display controller 206 controls display of various types of displays 210.

An external memory controller 207 controls data access to an external storage apparatus 211 storing various data, for example, in a hard disk (HDD). The storage units 1022 and 1032 correspond to the external storage apparatus 211. A network controller 208 is connected to the internet 101 to perform processing for controlling communication with the external apparatuses via the network.

Figure 3:
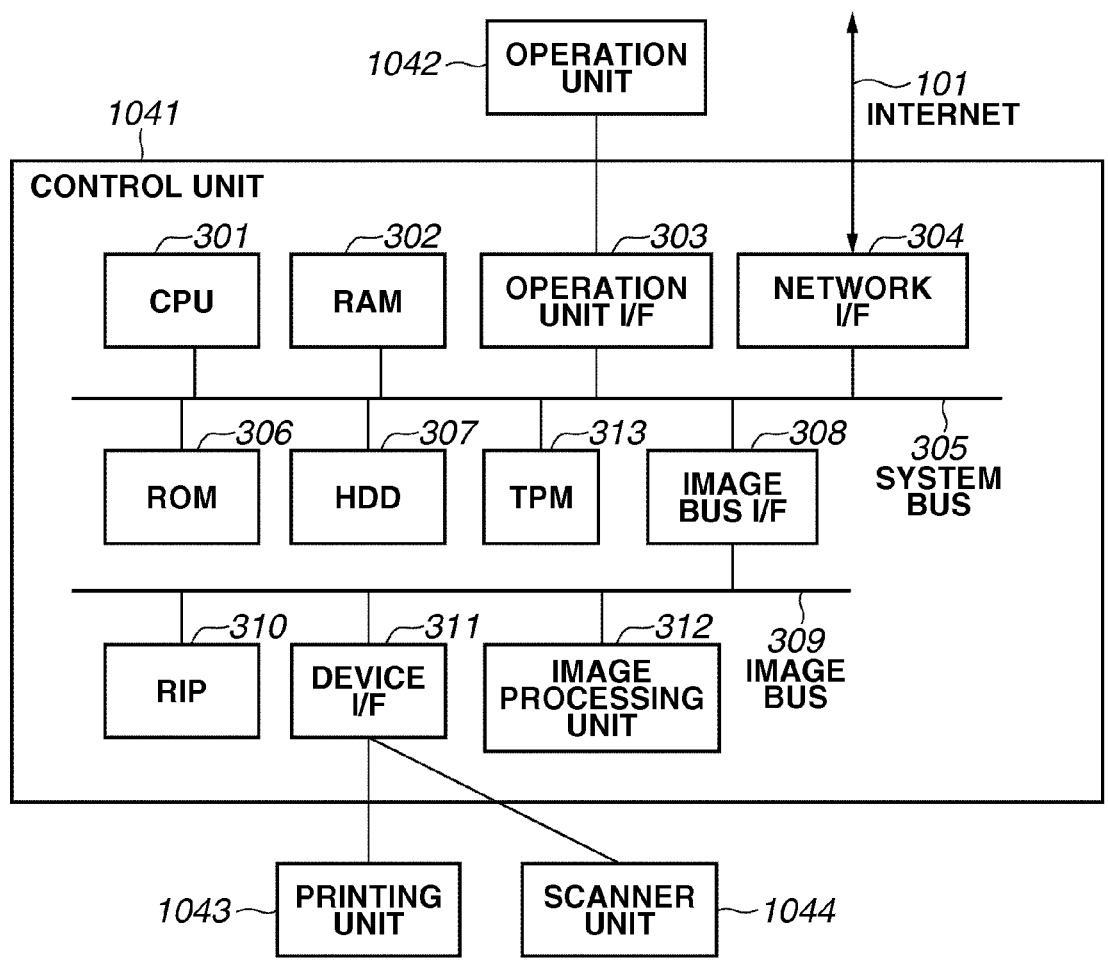
FIG. 3 is a block diagram illustrating a hardware configuration of a printing apparatus 104 according to the first exemplary embodiment.

FIG. 3 illustrates a hardware configuration diagram of a printing apparatus 104 included in the image processing system according to the first exemplary embodiment. The printing apparatus 104 includes the control unit 1041 for controlling the printing apparatus. The control unit 1041 controls the print unit 1043 that is an image output device and the scanner unit 1044 that is an image input device, and further connects to a local area network (LAN) and a public line to input and output the image information via the LAN and the public line.

The control unit 1041 includes a CPU 301. The CPU 301 is a CPU. The CPU 301 transmits and receives the data to and from a RAM 302, a ROM 306, an HDD 307, an image bus interface 308, an operation unit interface 303, and a network interface 304 via a system bus 305.

The RAM 302 functions as a main memory of the CPU 301, a working area and an image memory for temporary storing the image data. The ROM 306 is a boot ROM. The ROM 306 stores a boot program (activation program) of the printing apparatus. The HDD 307 functions as an external storage region for storing system software and the image data.

The operation unit interface 303 is an interface that performs input and output between the control unit 1041 and the operation unit 1042. The operation unit interface 303 outputs the image data to be displayed on the operation unit 1042 and transmits to the CPU 301 information input by the user via the operation unit 1042. The network interface 304 performs control processing of communication with the external apparatus connected via the internet 101.

An image bus interface 308 functions as a bus bridge connecting the system bus 305 with an image bus 309 that transfers the image data at high speed and converting a data structure. The image bus 309 functions as a bus via which a raster image processer (RIP) 310, a device interface 311, an image processing unit 312, the print unit 1043, and the scanner unit 1044 transmit and receive the data with one another.

A trusted platform module (TPM) 313 is a security chip aiming at preventing data leakage. The TPM 313 can produce an encryption key inside the chip. According to the first exemplary embodiment, the TPM 313 produces a pair of keys, which are a public key and a secret key. Further, the TPM 313 can perform data encryption processing and data decryption processing inside the chip.

Since the secret key produced by the TPM 313 is managed inside the chip, decryption processing cannot be performed on the data on which the encryption processing has been performed with the public key produced by the TPM 313 with any other key but with the secret key produced by the TPM 313 only. More specifically, it is impossible to decrypt the data on which the encryption processing has been performed with any other apparatus but with the apparatus that has produced the secret key only. For a method of encrypting the key, the generally known public key encryption method is adopted.

Next, a software configuration in the image processing system according to the first exemplary embodiment will be described with reference to FIG. 4. FIG. 4 illustrates the software configuration of the server 102, the host computer 103, and the printing apparatus 104 included in the image processing system according to the first exemplary embodiment.

The server 102 includes a web server unit 4011, an application server unit 4012, a multi tenant data management unit 4013, and an encryption management unit 4014. Program files for realizing the devices described above are stored in the storage unit 1022 (external storage apparatus 211). Various types of functions provided as the web applications by the server 102 are realized when the program files thereof are read into the RAM 202 and then performed by the CPU 201.

The web server unit 4011 receives via the internet 101 a hyper text transfer protocol (HTTP) request from the web browser 4021 of the host computer 103 or the web browser 4032 of the printing apparatus 104 that will be described below. Further, the web server unit 4011 receives a web service call request from a web request unit 4033 of the printing apparatus 104 that will be described below.

Upon receiving the request, the web server unit 4011 calls up the application server unit 4012 (corresponding to the above-described web application) to cause the application server unit 4012 to perform processing according to the request.

In response to reception of the web service call request by the web server unit 4011, the application server unit 4012 calls up the multi tenant data management unit 4013 to realize the service that can attain the execution result. Further, the application server unit 4012 can also call up the encryption management unit 4014 to realize the encryption processing on the data.

The multi tenant data management unit 4013 performs processing for executing registration, acquisition, search, and deletion on the content data stored in the storage unit 1022, and also management processing on related information accompanying the content data, namely, content data information. The encryption management unit 4014 performs management of production and deletion of the common key, and processing of encryption and decryption of the content data with the common key. A generally known common key encryption method is adopted as the common key. The common key is used in the first exemplary embodiment, however, other key encryption methods may be used.

An authentication unit 4015 performs authentication processing. When the web server unit 4011 of the server 102 receives the processing request, the authentication unit 4015 performs the authentication processing for authenticating the user who uses the apparatus that has requested the processing. If the authentication is successful, within the authority of the authenticated user, the user can use the service provided by the server 102. If the authentication fails, an authentication fail error is responded to a request source, and the user cannot use the service provided by the server 102.

The meaning of "within the user's authority" is, for example, if the user is a manger, the manager can use all the services provided by the server 102, and if the user is a general user, the user can only use a part of the services provided by the server 102. Any forms of the authentication method can be adopted.

The host computer 103 includes the web browser 4021. The web browser 4021 is stored as a program file in the storage unit 1032. The web browser 4021 can be realized when the program file for realizing the web browser 4021 is read into the RAM 202 and then executed by the CPU 201.

The printing apparatus 104 includes a user interface 4031, the web browser 4032, the transmission application 4042, the web request unit 4033, a control application interface (API) 4034, a job manager 4035, and a print manager 4036.

Further, the printing apparatus 104 includes a page description language (PDL) manager 4037, a data management unit 4038, a printing apparatus information management unit 4039, and an encryption management unit 4040. Program files for realizing functions of the above-described units are stored in the HDD 307. Various types of functions provided by the printing apparatus 104 can be realized when the program files described above are read into the RAM 302 and then executed by the CPU 301.

When the user uses various types of functions provided by the printing apparatus 104, the user interface 4031 intermediates between the device and user operations. The user interface 4031 transfers operation information to various programs that will be described below according to user's operations input via the operation unit 1042.

The web browser 4032 is connected to the server 102 using the HTTP via the internet 101 and performs various processing provided by the server 102. The web browser 4032 is displayed on the operation unit 1042 and receives input by the user. The operation information input by the user into the web browser 4032 is transferred to various programs of the printing apparatus that will be described below via the user interface 4031. The transmission application 4042 transmits the data input from the scanner unit 1044 to the external apparatus.

The web request unit 4033 transmits the web service request to the web server unit 4011 of the server 102 and receives the response therefrom via the internet 101.

The control API 4034 provides an interface via which the user interface 4031 accesses the job manager 4035, the print manager 4036, and the PDL manager 4037. The control API 4034 can reduce dependence among the programs, thereby increasing availability thereof.

The job manager 4035 interprets various processing instructed by the control API 4034 and then gives instructions to the print manager 4036 and the PDL manager 4037. Further, the job manager 4035 integrally manages the hardware processing performed by the printing apparatus 104.

The print manager 4036 manages and controls the print processing instructed by the job manager 4035. The PDL manager 4037 converts the print data instructed by the job manager 4035 into PDL. The above-described encryption management unit 4014 also functions as the print manager 4036 and the PDL manager 4037.

The data management unit 4038 manages and controls the content data stored in the HDD 307. The printing apparatus information management unit 4039 manages printing apparatus identification information about the printing apparatus 104 and installment location information thereabout (including information about an IP address of the printing apparatus 104 on the network).

The encryption management unit 4040 provides an access interface to the TPM 313. The encryption management unit 4040 performs printing apparatus key management such as production and deletion of the encryption key, the encryption processing using the public key, and the data decryption processing using the secret key. Details will be described below. The encryption key produced by the encryption management unit 4040 produces two encryption keys of the encryption key prepared for each user who has succeeded in the authentication by the server 102 and that common among the users who have succeeded in the authentication thereby.

A format conversion manager 4041 performs processing for converting the data input via the scanner unit 1044 into the content data in PDF and also converting the content data into the print data.

Figure 5A:
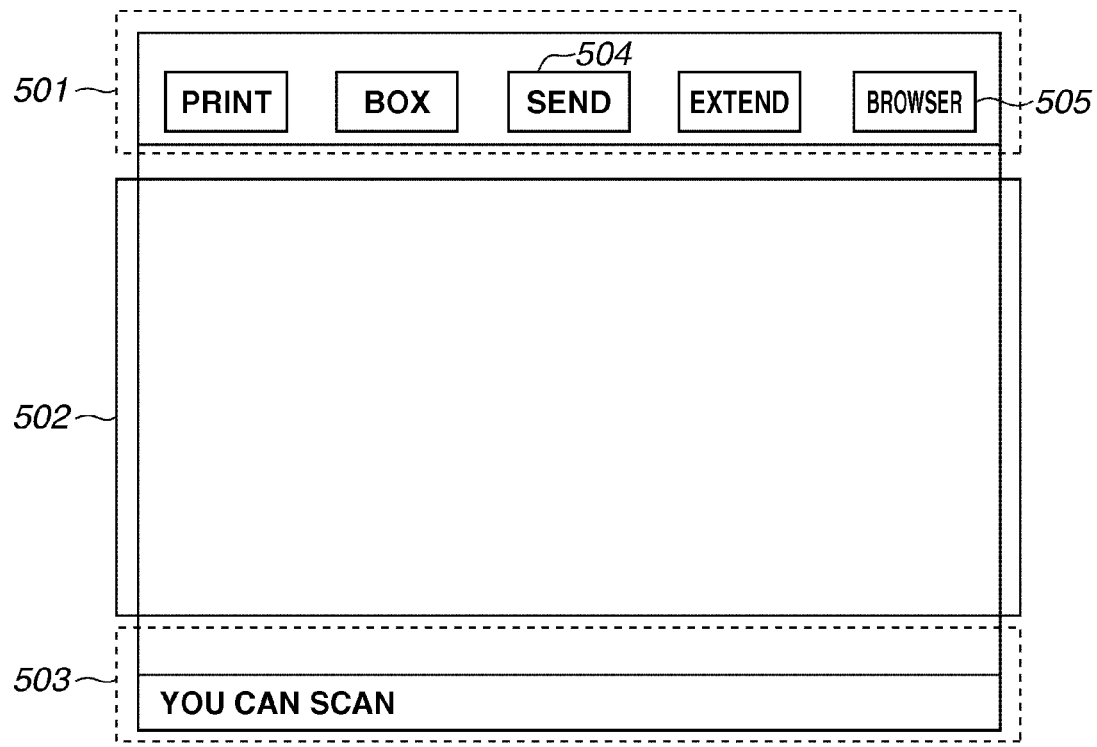
FIG. 5A illustrates a screen provided via a user interface 4031 of the printing apparatus 104 according to the first exemplary embodiment.

Next, further details about the user interface 4031 will be described with reference to FIGS. 5A and 5B. FIG. 5A illustrates a screen provided by the user interface 4031 of the printing apparatus 104.

In a program activation region 501, to receive services that have been previously registered, buttons for activating the web application of the server 102 are displayed. Upon pressing a transmission button 504, to receive the storage service, the transmission application 4042 is activated.

Upon pressing a browser button 505, the web browser 4032 is activated. A program display region 502 is a region for displaying a setting screen to receive settings from the user for the program activated to receive a predetermined service. A status display region 503 is a region for displaying a status of the printing apparatus 104.

Figure 5B:
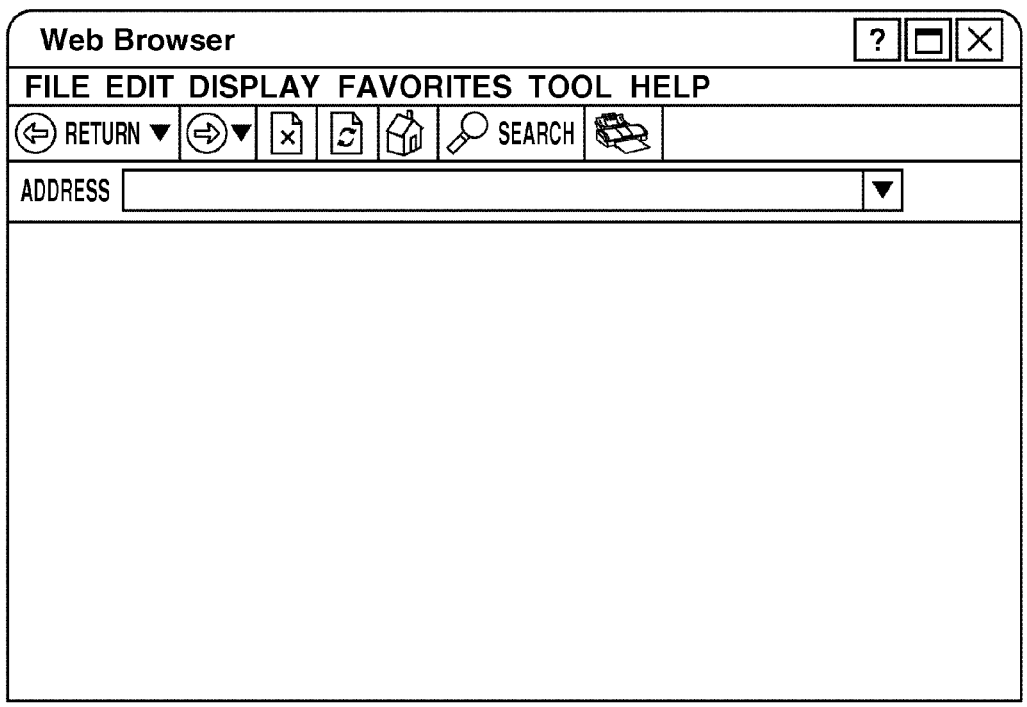
FIG. 5B illustrates a user interface displayed by a web browser 4021 according to the first exemplary embodiment.

FIG. 5B is a user interface displayed on the web browser 4021. The user interface illustrated in FIG. 5B is displayed on the general web browser.

Next, a document management table 601 managed by the multi tenant data management unit 4013 will be described. FIG. 6A illustrates an example of a table for managing the content data stored in the storage unit 1022 of the server 102 and the information about the content data. A document management table 601 includes a document identification (ID) 602, a document name 603, access right information 604, security type information 605, encryption key identification information ID 606, registered device information 607, and document data 608.

The document ID 602 stores numbers for uniquely identifying the content data. The document name 603 stores a name of the content data. The access right information 604 stores access authority information for accessing the content data. The access right information can be identified from the authentication information managed by the authentication unit 4015 of the server 102. Further, from the access right information, which user or which apparatus is permitted to access the content data can be specified.

The security type information 605 stores security type information of the content data that will be described below. The encryption key identification information ID 606 stores information for identifying the encryption key to be used to perform the encryption processing on the content data. The registered device information 607 stores device information about the apparatus that has requested storage of the content data. The information stored in the above-described columns in the first exemplary embodiment is referred to as the information about the content data as a whole.

The document data 608 stores information about a storage location of the content data stored in the server 102 or the main body of the content data. The multi tenant data management unit 4013 performs processing for registration, acquisition, search, and deletion for the columns 602, 603, 604, 605, 606, 607, and 608 in the document management table 601.

Next, the security type information 605 will be described with reference to FIG. 6B. The security type information 605 is the information for identifying what kind of security processing is performed on the content data. The security type information 605 includes a printing apparatus key method 609 used by the printing apparatus 104 to perform the encryption processing on the content data, a server key method 610 used by the server 102 to perform the encryption processing thereon, and a user key method 611.

The printing apparatus key method 609 adopts the public key encryption method and performs the encryption processing and the decryption processing on the content data using the public key and the secret key respectively produced by the encryption management unit 4040 of the printing apparatus 104. The server key method 610 and the user key method 611 adopt the common key encryption method and perform the encryption processing and the decryption processing on the content data using the common key produced by the encryption management unit 4014.

The common key of the server key 610 is used in common by a plurality of users who have succeeded in the authentication performed when using the service provided by the server 102. In other words, when the server key 610 is used, the content data encrypted with the common key can be decrypted by the user who has succeeded in the authentication performed by the server 102.

The common key of the user key 611 is prepared for each of a plurality of users who have succeeded in the authentication performed when using the service provided by the server 102, and thus the user key 611 can be used by only the corresponding users. In other words, when the user key 611 is used, the content data encrypted with the encryption key can be decrypted only by the user who is an owner of the data. The above-described security type information about each content data is managed by the security type information 605 in the document management table 601 included in the server 102 described above.

Even if the content data encrypted with the public key of the printing apparatus 104 and stored and registered by the server 102 is illegally acquired, without accessing the printing apparatus 104, the data cannot be decrypted, and thus, the content data cannot be leaked.

Further, even if the content encrypted with the common key of the server 102 is illegally acquired, without decrypting the data with the common key, the content data cannot be leaked. However, if the common key of the server 102 is also illegally acquired, the data can be decrypted. Therefore, a security level when using the common key of the server 102 is lower than that when using the key of the printing apparatus 104.

However, when the content data is encrypted using the encryption key produced by the server 102, the server 102 can perform the decryption processing on the data. Thus, the processing can be performed on the content data using various types of services such as the print data processing. More specifically, since the processing provided by the server 102 can be performed on the data, the services provided thereby can be received.

The content data on which the processing has been performed by the services described above is encrypted again with the encryption key of the server 102 and stored therein. The server 102 repeatedly performs this processing according to the processing request from the user.

Figure 7:
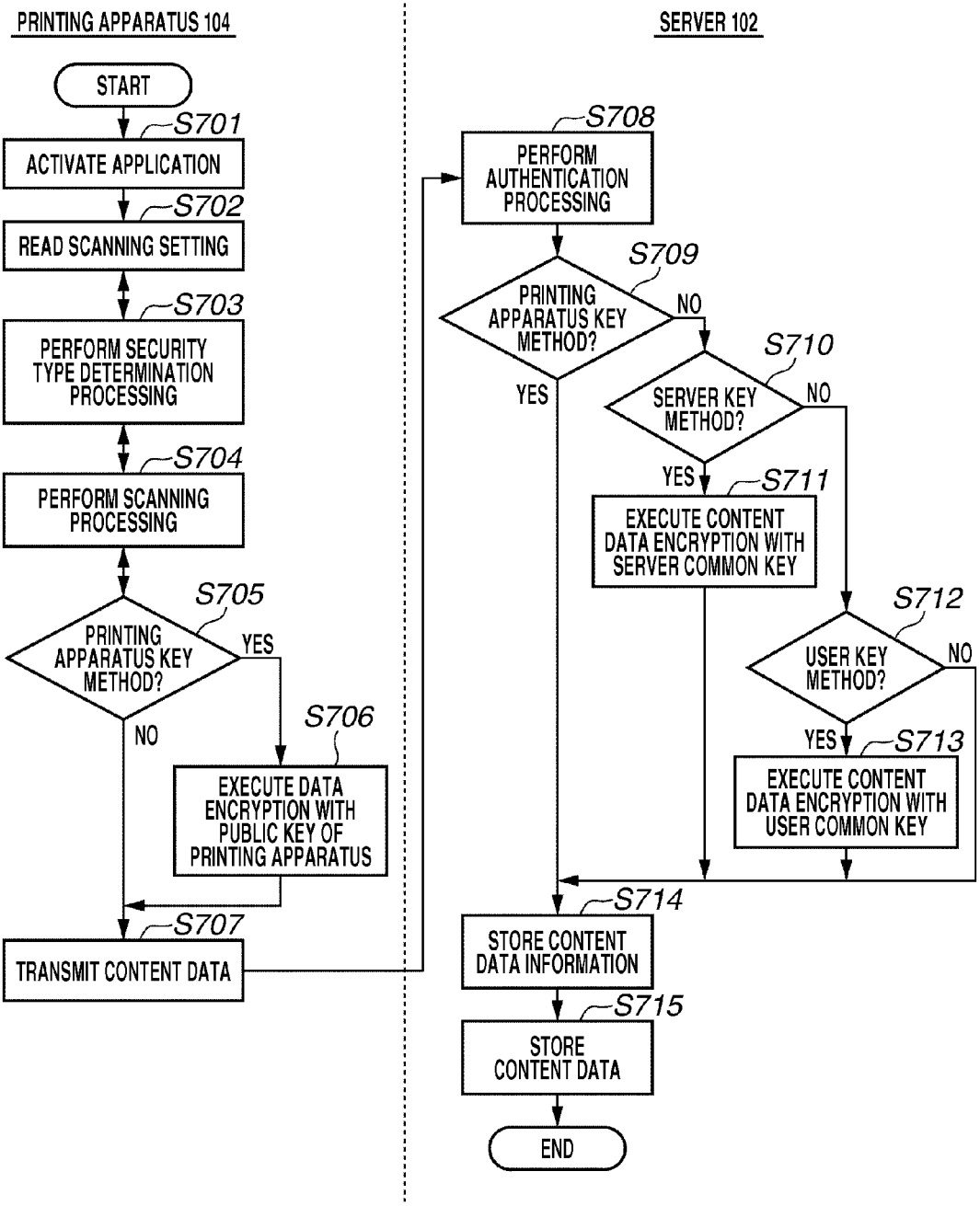
FIG. 7 is a flowchart illustrating content data registration processing according to the first exemplary embodiment.

Next, data storage and registration processing will be described with reference to FIG. 7. FIG. 7 is a flowchart illustrating the processing for storing the content data and the information thereabout in the storage unit 1022 of the server 102 using the transmission application 4042 of the printing apparatus 104.

In step S701, the printing apparatus 104 reads the transmission application 4042 stored in the HDD 307 into the RAM 302. When reading is completed, the CPU 301 activates the transmission application 4042 read into the RAM 302 and displays the transmission application 4042 on the operation unit 1042.

In step S702, when the user presses a scanning execution button 803 that will be described below, the printing apparatus 104 receives a scanning execution operation and reads scanning setting input via the transmission application 4042.

Figure 8:
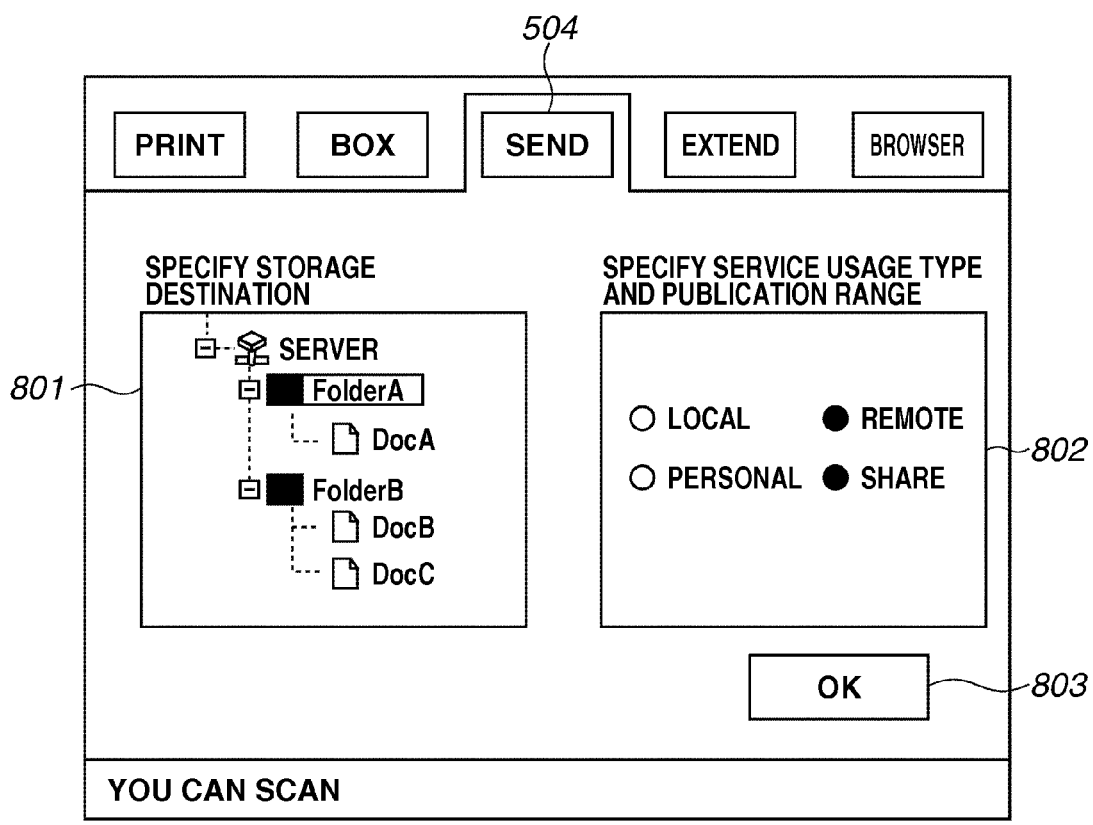
FIG. 8 illustrates a scanning setting screen of a transmission application 4042 according to the first exemplary embodiment.

FIG. 8 illustrates a scanning setting screen of the transmission application 4042. The user can set a registration destination in a scan data registration destination specifying region 801. In FIG. 8, the user performs the registration destination setting by browsing a tree structure while the printing apparatus 104 communicates with the server 102 in dialogue.

In a public area setting region 802, the user can set a service usage form and a public area of the content data to be stored and registered. The service usage form has options of "LOCAL" and "REMOTE", and the public area has options of "PERSONAL" and "SHARE".

In addition, other than those described above, the scanning setting includes a document name (not illustrated), resolution (not illustrated), and a document format (not illustrated). A scanning execution button 803 is used to perform scanning. When the user presses the scanning execution button 803, the printing apparatus 104 reads various setting values set on the screen illustrated in FIG. 8.

The "LOCAL" means that the user does not use a service for performing the processing on the content data provided by the server. The "REMOTE" means that the user uses a service for performing the processing on the content data provided by the server. Both of the "LOCAL" and the "REMOTE" are used when storage of the content data in the server 102 is instructed. The "PERSONAL" means that the content data is not shared by the users. The "SHARE" means that the content data is shared by the users.

The printing apparatus 104 according to the first exemplary embodiment, when the "LOCAL" is instructed, even when the instruction of the "PERSONAL" or "SHARE" is received, the encryption processing is performed on the generated data with the encryption key produced by the printing apparatus 104.

More specifically, even though the "SHARE" is instructed, the encryption processing is performed on the content data with the encryption key produced by the printing apparatus 104. That is because the image processing of the first exemplary embodiment places more emphasis on preventing the data leakage rather than using the service provided by the server 102.

Therefore, even if the user instructs that the content data may be shared, when the service for performing the processing provided by the server 102 is not used, other users cannot perform the decryption processing.

In step S703, the printing apparatus 104 determines the security type from the scanning setting read in step S702.

FIG. 9 illustrates the security type determination method. In a security type determination mapping table 901 illustrated in FIG. 9, the security types are mapped for specification results. When the specification result is "LOCAL & SHARE" 902, the printing apparatus key 609 is adopted as the security type.

When the specification result is "LOCAL & PERSONAL" 903, the printing apparatus key method 609 is adopted as the security type. When the specification result is "REMOTE & SHARE" 904, the server key method 610 is adopted as the security type, and the instruction for performing the encryption processing using the server key method 610 is transmitted from the printing apparatus 104 to the server 102.

When the specification result is "REMOTE & PERSONAL" 905, the user key method 611 is adopted as the security type, and the instruction for performing the encryption processing using the user key method 611 is transmitted from the printing apparatus 104 to the server 102.

According to the first exemplary embodiment, the table in which the public ranges and the security types are mapped in the printing apparatus 104 is previously prepared so that the printing apparatus 104 can determine the security type. In addition, there is a method for determining the security type by the document format set by the scanning setting. Further, there is a method for determining the security type by the server 102. The security type determination method by the server 102 includes the method for determining the security type by mapping the user authentication information and the security type in the server 102.

Further, the security type determination method by the server 102 includes a method for determining the security type by mapping the security types and the data storage destinations in the server 102. When the security type is determined by the server 102, the security type determination request is transmitted from the printing apparatus 104 to the server 102, and in response to the request, the result will be transmitted.

In step S704, the printing apparatus 104 receives the data input via the printing apparatus 1044, and the data is converted into the document format by the format conversion manager 4041 based on the scanning setting to generate the content data. In step S705, when the printing apparatus key 609 method is used as the security type determination processing in step S703 (YES in step S705), the processing proceeds to step S706. When another method is used (NO in step S705), the processing proceeds to step S707.

In step S706, the encryption management unit 4040 of the printing apparatus 104 performs the encryption processing on the content data generated in step S704 using the public key produced by the printing apparatus 104. In step S707, the printing apparatus 104 transmits the content data and the information thereabout from the web request unit 4033 to the server 102.

In step S706, when the content data is encrypted, the information about the content data to be transmitted includes the document name 603, the security type information 605, the encryption key identification information ID 606, and the registered device information 607. In step S706, when the content data is not encrypted, the information about the content data to be transmitted includes only the document name 603.

The document name 603 is the information read as the scanning setting. The security type information 605 is determined in step S703. The encryption key identification information ID 606 is used to identify the public key of the printing apparatus 104 that is managed by the encryption management unit 4040 of the printing apparatus 104. The registered device information 607 is used to uniquely identify the printing apparatus 104 managed by the printing apparatus information management unit 4039 of the printing apparatus 104.

In step S708, using the authentication unit 4015, the web server unit 4011 performs the authentication processing on the user who is to receive the service provided by the server 102, regarding a request for storing and registering the content data received from the printing apparatus 104 and the information thereabout.

When the authentication is successful, the application server unit 4012 performs the processing corresponding to the request. When the authentication fails, the server 102 transmits to the printing apparatus 104 a registration fail error in response to the registration request.

In step S709, the application server unit 4012 reads the security type information 605 from the information about the content data received by the web server unit 4011 to determine whether the security type information 605 includes the printing apparatus key 609. When the security type information 605 includes the printing apparatus key method 609 (YES in step S709), the processing proceeds to step S714. When the security type information 605 does not include the printing apparatus key method 609 (NO in step S709), the processing proceeds to step S710.

In step S710, the application server unit 4012 determines whether the security type information 605 includes the server key method 610. When the security type information 605 includes the server key method 610 (YES in step S710), the processing proceeds to step S711. When the security type information 605 does not include the server key method 610 (NO in step S710), the processing proceeds to step S712.

In step S711, the application server unit 4012 performs the encryption processing on the data received by the web server unit 4011 using the server key of the server 102. In step S712, the application server unit 4012 determines whether the security type information 605 includes the user key 611. When the security type information 605 includes the user key method 611 (YES in step S712), the processing proceeds to step S713. When the security type information 605 does not include the user key method 611 (NO in step S712), the processing proceeds to step S714.

In step S713, the application server unit 4012 performs the encryption processing on the content data received by the web server unit 4011 using the user key of the server 102 corresponding to the user who has given two instructions of the "REMOTE" and "PERSONAL".

In step S714, the application server unit 4012 registers the information about the content data in the document management table 601. In step S715, the application server unit 4012 of the server 102 registers the content data for the document data 608 in the document management table 601.

Figure 10:
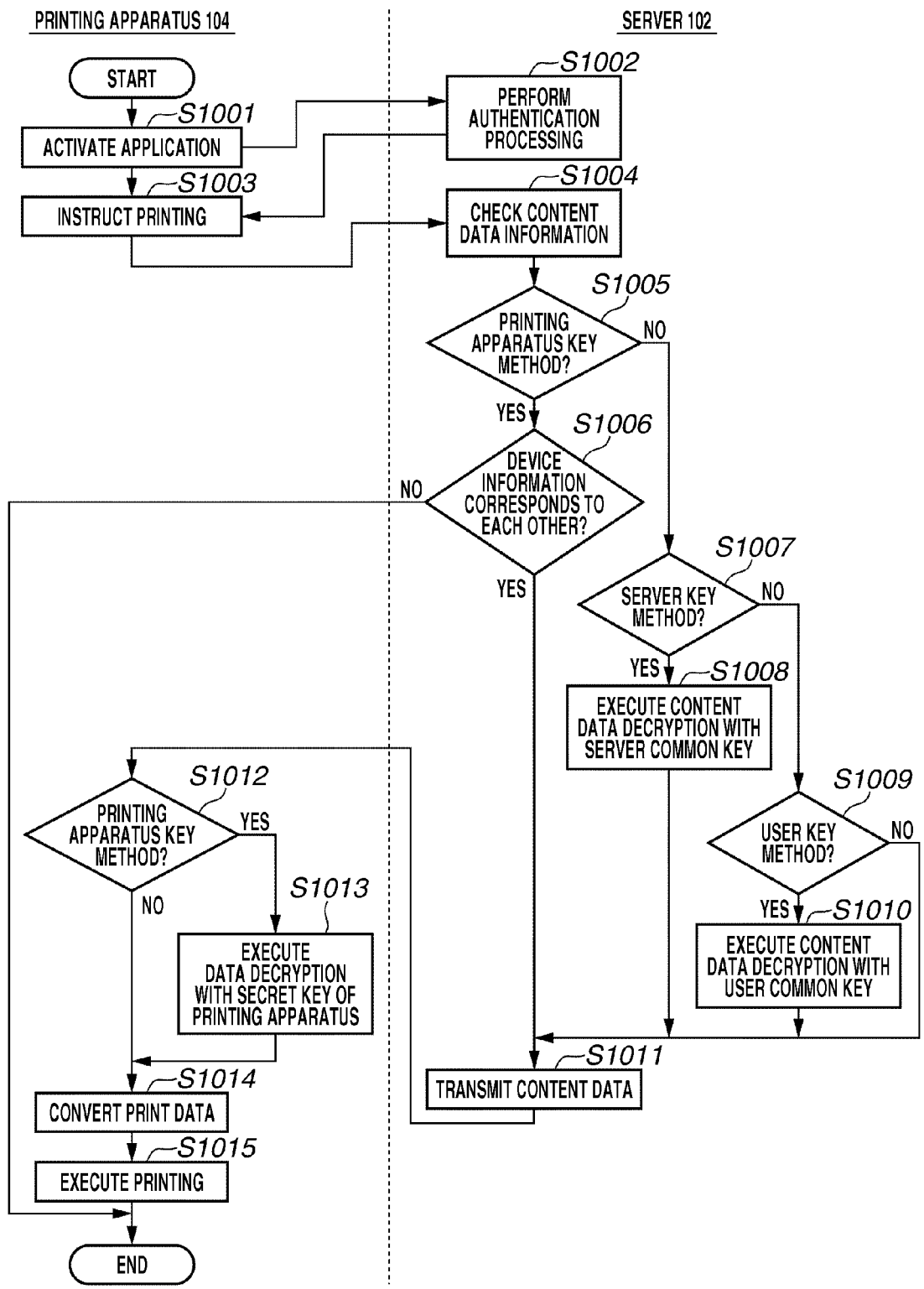
FIG. 10 is a flowchart illustrating print processing performed on content data according to the first exemplary embodiment.

Next, the print processing on the data according to the first exemplary embodiment will be described with reference to FIG. 10. FIG. 10 is a flowchart illustrating the printing processing performed by the printing apparatus 104 for printing the content data stored in the storage unit 1022 of the server 102 using the web browser 4032 of the printing apparatus 104.

In step S1001, the printing apparatus 104 reads into the RAM 302 the program of the web browser 4032 stored in the HDD 307. When reading is completed, the CPU 301 activates the web browser 4032 that is read into the RAM 302 and displays on the operation unit 1042 the user interface (UI) of the web browser 4032.

In step S1002, the web server unit 4011 of the server 102 performs authentication processing on the user who has given the received print instruction from the printing apparatus 104 using the authentication unit 4015. When the authentication processing is successful, the application server unit 4012 of the server 102 starts preparation for performing the processing for a request. When the authentication processing fails, the server 102 transmits the print instruction fail error in response to the print instruction request.

In step S1003, the printing apparatus 104 receives the print instruction for the document specified by the user via the web browser 4032, and transmits the print instruction to the server 102. Device information for uniquely identifying the printing apparatus 104 managed by the printing apparatus information management unit 4039 is added to a header portion of an HTTP request to be transmitted from the printing apparatus 104.

Step S1003 will be described in detail. The user browses a list of the content data that can be printed by the user, and selects the content to be printed. The print instruction for the content data of the selected content is transmitted to the server. Screen information (e.g., hyper text makeup language (HTML) file) for displaying the list is transmitted from the server 102.

The server 102 generates the screen information as follows. The server 102 specifies the content data from the storage region, based on information about three types of content data, which are the content data on which the encryption processing has been performed using the encryption key produced by the printing apparatus, the content data on which the encryption processing has been performed using the server key, and the content data on which the encryption processing has been performed using the user key corresponding to the user who uses the printing apparatus 104.

The information about three types of content data in this case describes various information stored in the security type information 605 of the document management table 601. For example, the server 102 can specify the content data from the document ID 602.

In addition to the content data described above, the server 102 includes the content data on which the encryption processing has been performed using the user key corresponding to a user other than the user who uses the printing apparatus 104. However, the printing apparatus 104 cannot acquire the content data on which the decryption processing has been performed on the encrypted content data described above.

Accordingly, the content data cannot be printed by the printing apparatus 104 and then is not included in a list of the content data that can be printed. As a result, on the operation screen of the server 102, the list is displayed that excludes the content data on which the encryption processing has been performed using the user key corresponding to the user other than the user who uses the printing apparatus 104.

In step S1004, the application server unit 4012 of the server 102 acquires the information about the content data that has received the print instruction from the document management table 601 of the multi tenant data management unit 4013. In step S1005, the application server unit 4012 of the server 102 reads the security type information 605 acquired in step S1004. When the security type information 605 includes the printing apparatus key method 609 (YES in step S1005), the processing proceeds to step S1006. When the security type information 605 does not include the printing apparatus key method 609 (NO in step S1005), the step proceeds to step S1007.

In step S1006, the application server unit 4012 compares device information added to the print instruction with the registered device information 607 regarding the content data acquired in step S1004. When the two kinds of device information correspond with each other (YES in step S1006), it is determined that the printing apparatus 104 that has performed the encryption processing on the content data has given the print instruction, and the processing proceeds to step S1011. When the two kinds of device information do not correspond with each other (NO in step S1006), the error is responded to the printing apparatus 104.

The processing in step S1006 may be performed after the processing in step S1002. In this case, as the list of the content data that can be printed by the printing apparatus 104, the list that excludes the content data on which the encryption processing has been performed by the printing apparatus other than the printing apparatus 104 is displayed on the operation screen of the printing apparatus 104. With this arrangement, the user can select the content data to be printed more easily.

In step S1007, the application server unit 4012 reads the security type information 605 acquired in step S1004. When the security type information 605 includes the server key 610 (YES in step S1007), the processing proceeds to step S1008. When the security type information 605 does not include the server key 610 (NO in step S1007), the processing proceeds to step S1009.

In step S1008, the application server unit 4012 acquires the data that has received the print instruction based on the information included in the document data 608 in the document management table 601 and decrypts the data using the server key of the encryption keys that have been previously stored.

In step S1009, the application server unit 4012 reads the security type information 605 acquired in step S1004. When the security type information 605 includes the user key method 611 (YES in step S1009), the processing proceeds to step S1010. When the security type information 605 does not include the user key method 611 (NO in step S1009), the processing proceeds to step S1011.

In step S1010, the application server unit 4012 acquires the data that has received the print instruction based on the information included in the document data 608 in the document management table 601 and decrypts the data using the user key, corresponding to the user who has given the print instruction, of the encryption keys that have been previously stored.

In step S1011, the web server unit 4011 transmits to the printing apparatus 104 the content data, the security type information 605, and the encryption key identification information ID 606 as the response for the print instruction request in step S1003.

In step S1012, the security type information 605 received by the web browser 4032 of the printing apparatus 104 from the server 102 includes the printing apparatus key method 609 (YES in step S1012), the processing proceeds to step S1013. When the security type information 605 does not include the printing apparatus key method 609 (NO in step S1012), the processing proceeds to step S1014.

In step S1012, the printing apparatus 104 compares the encryption key identification information ID 606 received from the server 102 with the encryption key identification information acquired from the encryption management unit 4040 of the printing apparatus 104. More specifically, the printing apparatus 104 confirms whether the encryption key used when the encryption processing has been performed on the content data corresponds to the encryption key of the printing apparatus 104.

As a result of the confirmation, when the encryption key used when the encryption processing has been performed on the content data corresponds to the encryption key of the printing apparatus 104 (YES in step S1012), in step S1013, the content data received from the server 102 is decrypted using the secret key of the printing apparatus 104. As a result of the confirmation, when the two keys described above do not correspond to each other (NO in step S1012), the printing apparatus 104 performs error ending processing.

In step S1014, the format conversion manager 4041 of the printing apparatus 104 converts the content data into the data format (print data) in which the data can be printed. In step S1015, the printing apparatus 104 performs the print processing for outputting the print data in print.

As described above, according to the first exemplary embodiment, even if the content data is illegally acquired, the information leakage can be prevented. Further, since the encryption processing is performed according to user's operation, a security level can be appropriately maintained according to a purpose for using the content data.

A second exemplary embodiment of the present invention will be described. Only the configurations different from those in the first exemplary embodiment will be described.

Figure 11:
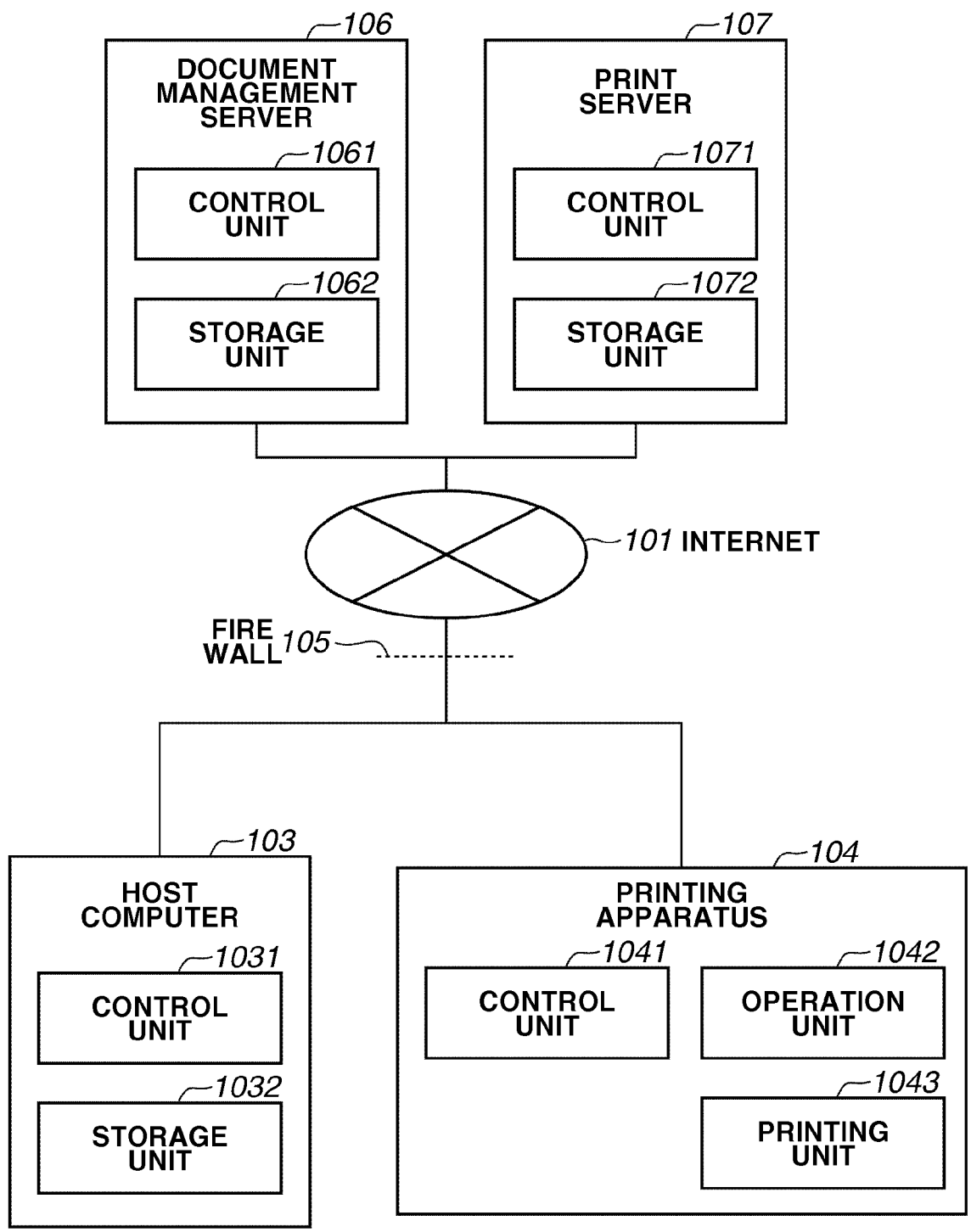
FIG. 11 is a block diagram illustrating a configuration of an image processing system according to a second exemplary embodiment.

First, with reference to FIG. 11, the image processing system according to the second exemplary embodiment will be described. FIG. 11 illustrates an entire configuration of the image processing system according to the second exemplary embodiment. The image processing system according to the second exemplary embodiment includes the internet 101, the document management server 106, the print server 107, the host computer 103, the printing apparatus 104, and the firewall 105.

The document management server 106 includes a control unit 1061 and a storage unit 1062. The storage unit 1062 stores the content data. The control unit 1061 performs generally known functions as the application server. For example, the web application that performs the processing according to each of the processing requests from the print unit 1043 of the host computer 103 and the web browser 4032 of the printing apparatus 104 is installed in the control unit 1061. The web application in the document management server 106 performs the data storage processing on the storage unit 1062, the display processing and acquisition processing of the stored content data.

The print server 107 includes a control unit 1071 and a storage unit 1072. The print server 107 functions as a spooler to store the print data in the storage unit 1072. The control unit 1021 performs generally known functions as the application server. For example, the web application that performs the processing according to each of the processing requests from the print unit 1043 of the host computer 103 and the web browser 4032 of the printing apparatus 104 is installed in the control unit 1021.

The web application of the print server 107 performs spool processing for converting the input content data into the print data and storing the print data in the storage unit 1072 and the print processing on the print data stored in the storage unit 1072. The hardware configurations of the document management server 106 and the print server 107 correspond to those of a general information processing apparatus described with reference to FIG. 2.

FIG. 12 illustrate the software configuration of the document management server 106, the print server 107, the host computer 103, and the printing apparatus 104 that are included in the image processing system according to the second exemplary embodiment.

The document management server 106 includes the format conversion manager 4041, the transmission application 4042, the authentication unit 4063, and the data information management unit 4064. The programs for realizing functions of the above-described units are stored in the storage unit 1062. Various services provided as the web application by the document management server 106 can be realized when the above-described program files are read into the RAM 202 and executed by the CPU 201.

The functions of the web server unit 4061, the application server unit 4062, and the authentication unit 4063 have the similar functions to those of the web server unit 4011, the application server unit 4012 and the authentication unit 4015 of the server 102. The data information management unit 4064 performs the processing for registration, acquisition, search, and deletion on the content data stored in the storage unit 1022, and also the management processing on the related information accompanying the content data.

The print server 107 includes a web server unit 4051, an application server unit 4052, an authentication unit 4053, a printing apparatus management unit 4054, an encryption management unit 4055, a multi tenant print data management unit 4056, a web service requester unit 4057, and print data conversion unit 4058. The programs for realizing functions of the above-described units are stored in the storage unit 1072.

Various services provided by the print server 107 as the web applications can be realized when the above-described programs are read into the RAM 202 and executed by the CPU 201. The web server unit 4051, the application server unit 4052, and the authentication unit 4053 have the similar functions to those of the web server unit 4011, the application server unit 4012 and the authentication unit 4015 of the server 102.

The printing apparatus management unit 4054 performs the processing for registration of the printing apparatus, acquisition of the information about the registered printing apparatus, search of the registered printing apparatus, and deletion of the registration information about the registered printing apparatus. The encryption management unit 4055 performs the key management of production and deletion of the common key, the processing of encryption and decryption of the data with the common key, and further the encryption processing on the data using the public key of the registered printing apparatus managed by the printing apparatus management unit 4054.

The multi tenant print data management unit 4056 performs the processing for registration, acquisition, search, and deletion on the print data spooled in the storage unit 1022 and the management processing on the related information accompanying the print data.

The web service requester unit 4057 transmits the web service request to the web server unit 4061 via the internet 101 and receives the response thereto. A print data conversion unit 4058 converts the content data received from the document management server 106 into the print data that can be printed by the printing apparatus 104.

FIG. 13A illustrates a table of database for managing the information about the printing apparatus that is stored in the storage unit 1072 of the print server 107 according to the second exemplary embodiment. A printing apparatus management table 1301 includes a printing apparatus ID 1302, a printing apparatus name 1303, a security flag 1304, an encryption key 1305, and printing apparatus capacity information 1306.

The printing apparatus ID 1302 stores a number for uniquely identifying the printing apparatus. The printing apparatus name 1303 stores a name of the identified printing apparatus. The security flag 1304 stores information about whether the printing apparatus can perform the encryption processing and the decryption processing on the data.

An encryption key 1305 stores the public key of the printing apparatus. Printing apparatus capacity information 1306 stores capacity information about the printing apparatus. The printing apparatus management unit 4054 performs the processing for registration, acquisition, search, and deletion for the columns 1302, 1303, 1304, 1305, and 1306 in the printing apparatus management table 1301.

FIG. 13B illustrates a table of database for managing the print data spooled by the storage unit 1072 of the print server 107 and information about the print data according to the second exemplary embodiment. A print data management table 1311 includes a print data ID 1312, a print data name 1313, a data ID 1314, access right information 1315, security type information 1316, encryption key identification information 1317, a printing apparatus ID 1318, and print data 1319.

The print data ID 1312 stores a number for uniquely identifying the print data. The print data name 1313 stores a name of the identified print data. The data ID stores a number for uniquely identifying the data used to generate the print data.

The access right information 1315 stores the access right information about the print data. The security type information 1316 stores the security type information about the print data. The encryption key identification information 1317 stores the information for identifying the encryption key.

In the second exemplary embodiment, the information stored in the above-described columns is referred to as the information about the print data as a whole. The print data 1318 stores information about a storage location of the print data stored in the print server 107 or the print data itself.

In FIG. 12, a multi tenant document data management unit 4056 of the print server 107 described above performs the processing for registration, acquisition, search, deletion for the columns 1312, 1313, 1314, 1315, 1316, 1317, and 1318 in the print data management table 1311.

With reference to FIG. 13C, security type information 1321 according to the second exemplary embodiment will be described. The security type information 1321 is used to identify which security processing is performed on the print data. Security type information 1321 includes a printing apparatus key method 1322 and a server key method 1323.

The printing apparatus key method 1322 is the public key encryption method as the encryption method and uses the public key and the secret key produced by the encryption management unit 4040 of the printing apparatus 104. The encryption management unit 4055 of the print server 107 performs the encryption processing on the print data using the public key of the printing apparatus 104 managed by the encryption key 1305 in the printing apparatus management table 1301. Further, the encryption management unit 4055 performs the decryption processing on the print data using the secret key of the printing apparatus 104 produced by the encryption management unit 4040 of the printing apparatus 104.

The server key method 1323 is a common key encryption method as the encryption method, and uses the common key produced by the encryption management unit 4055 of the print server 107. The print server 107 performs the encryption processing on the print data using the common key of the print server 107 and the decryption processing on the print data using the common key thereof.

Next, the print data registration processing according to the second exemplary embodiment will be described with reference to FIG. 14.

FIG. 14 is a flowchart illustrating the processing for storing the data in the document management server 106 in the storage unit 1072 of the print server 107 as the print data using the web browser 4021 of the host computer 103. The authentication processing may be necessary every time the transmission/reception is performed between host computer 103 and the print server 107 and between the print server 107 and the document management server 106, however, this flowchart does not describe the authentication processing.

In step S1401, the host computer 103 reads the program for realizing the web browser 4021 stored in a storage unit 1032 into the RAM 302. When reading is completed, the CPU 301 executes the web browser 4021 read into the RAM 302.

In step S1402, the web browser 4021 transmits the HTTP request to acquire content data list information managed by the document management server 106 from the print server 107. The content data list information refers to all the content data stored in the storage unit 1062 of the document management server 106.

In step S1403, upon receiving the HTTP request from the web browser 4021, the web server unit 4051 calls the application server unit 4052. The print server 107 transmits to the web server unit 4061 the web service request for acquiring the content data list information managed by the document management server 106.

In step S1404, the web server unit 4061 receives the web service request from the web service requester unit 4057 via the internet 101. As the processing in response to the web service request, the application server unit 4062 calls the content data information management unit 4064 to acquire information about the stored data. The web server unit 4061 transmits the information about the content data to the print server 107.

In step S1405, the web service requester unit 4057 acquires the information about the content data received from the document management server 106. The application server unit 4052 dynamically generates a document list screen in the HTML format from the information about the data received by the web service requester unit 4057. The web server unit 4051 responds to the web browser 4021 with the list screen.

In step S1406, the host computer 103 displays on the web browser 4021 the document list screen received as an HTTP response from the web server unit 4051. In step S1407, the host computer 103 transmits the HTTP request for the specified document information specified by the user to the web server unit 4051 via the web browser 4021.

In step S1408, the web server unit 4051 receives the HTTP request for the specified document information from the web browser 4021. Upon receiving the HTTP request, the print server 107 calls the application server unit 4052. The application server unit 4052 registers the document ID of the specified document in the print data name 1313.

In step S1409, the application server unit 4052 takes out the list of the printing apparatus information from the print data management table 1311 and dynamically generates the printing apparatus list screen in HTML format from the printing apparatus information. The web server unit 4051 responds to the web browser 4021 of the host computer 103 with the printing apparatus list screen.

In step S1410, the host computer 103 displays on the web browser 4021 the printing apparatus list screen received from the web server unit 4051 as the HTTP response.

In step S1411, the host computer 103 transmits the HTTP request for the printing apparatus information specified by the user and the print data generation request to the web server unit 4051 of the print server 107 via the web browser 4021.

In step S1412, upon receiving the HTTP request from the web browser 4021, the web server unit 4051 calls the application server unit 4052. The application server unit 4052 transmits the web service request for acquiring the data of the specified document from the web service requester unit 4057 to the web server unit 4061 of the document management server 106 via the internet 101.

In step S1413, the web server unit 4061 receives the web service request from the web service requester unit 4057 via the internet 101. As the processing in response to the web service request, the application server unit 4062 calls the data information management unit 4064 to acquire the stored content data. The web server unit 4061 transmits the content data to the print server 107.

In step S1414, the application server unit 4052 acquires the printing apparatus information about the selected printing apparatus from the printing apparatus management table 1301 and reads the printing apparatus capacity information 1306. Based on the printing apparatus capacity information 1306, the print data conversion unit 4058 converts the received content data received from the document management server 106 into the print data, and the application server unit 4052 generates the print data.

In step S1415, the application server unit 4052 reads the security flag 1304 from the printing apparatus management table 1301. The application server unit 4052 determines whether the printing apparatus selected by the user has the functions for performing the encryption processing and the decryption processing on the data. When the selected printing apparatus has the functions for performing the encryption processing and the decryption processing (YES in step S1415), the processing proceeds to step S1416. When the selected printing apparatus does not have the functions for performing the encryption processing and the decryption processing (NO in step S1415), the processing proceeds to step S1417.

In step S1416, the application server unit 4052 acquires the public key of the printing apparatus from the encryption key 1305 of the selected printing apparatus, so that the application server unit 4052 can cause the encryption management unit 4055 to encrypt the print data using the public key thereof.

In step S1417, the application server unit 4052 acquires the common key of the print server 107 from the encryption management unit 4055, so that the application server unit 4052 can cause the encryption management unit 4055 to encrypt the print data using the common key.

In step S1418, the application server unit 4052 of the print server 107 causes the multi tenant print data management unit 4056 to store the print data information. In step S1419, the application server unit 4052 of the print server 107 causes the multi tenant print data management unit 4056 to store the print data.

Next, the print processing performed on the print data according to the second exemplary embodiment will be described with reference to FIG. 15.

Figure 15:
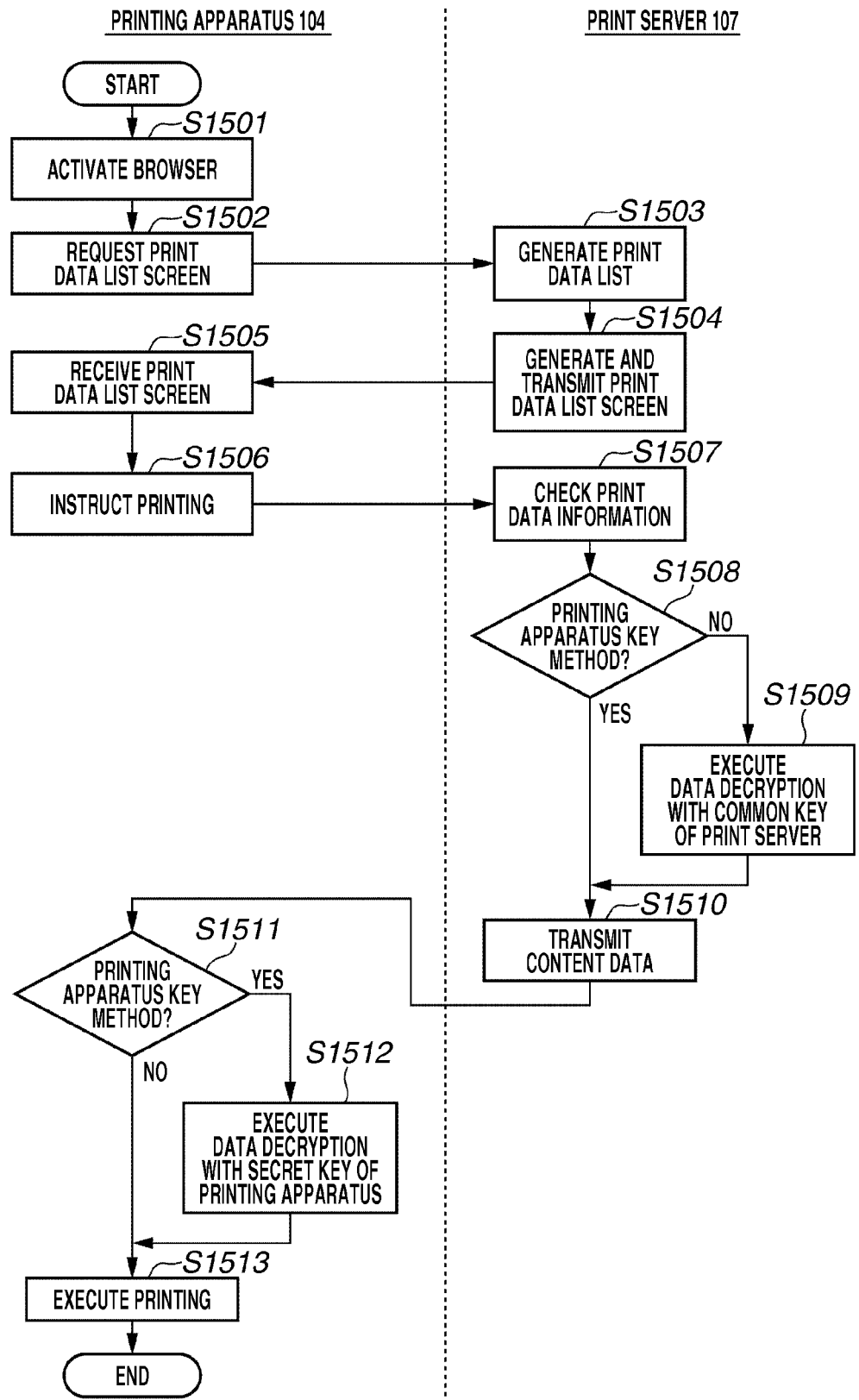
FIG. 15 is a flowchart illustrating print data print processing according to the second exemplary embodiment.

FIG. 15 is a flowchart illustrating the processing for printing the print data stored in the storage unit 1072 of the print server 107 by the printing apparatus 104 using the web browser 4032. The authentication processing may be necessary every time the transmission/reception of the content data is performed between host computer 103 and the print server 107, however, the second exemplary embodiment does not describe the authentication processing.

In step S1501, the printing apparatus 104 reads the program for realizing the web browser 4032 stored in the HDD 307 into the RAM 302. When reading is completed, the CPU 301 executes the web browser 4032 that has been read into the RAM 302.

In step S1502, the web browser 4032 transmits the HTTP request for acquiring from the print server 107 the print data list information managed by the print server 107.

In step S1503, upon receiving the HTTP request from the web browser 4032, the web server unit 4051 calls the application server unit 4052. The application server unit 4052 reads the printing apparatus information about a request source from the header portion of the HTTP request.

Based on the printing apparatus information that has been read, the list of the print data that can be printed by the printing apparatus of the request source is generated. The print data that can be printed refers to a list of the print data encrypted with the public key of the printing apparatus of the request source and that encrypted with the common key of the print server 107.

In step S1504, the application server unit 4052 dynamically generates the print data list screen in HTML format from the generated print data list. The web server unit 4051 responds to the web browser 4032 of the printing apparatus 104 with the print data list screen.

In step S1505, the print data list screen received from the web server unit 4051 is displayed as the HTTP response on the web browser 4032.

In step S1506, the printing apparatus 104 transmits the print request for the print data instructed to be printed by the user via the web browser 4032 to the web server unit 4051 of the print server 107. In step S1507, the application server unit 4052 acquires the information about the print data that has received the print instruction from the print data management table 1311.

In step S1508, the application server unit 4052 reads the security type information 1321. When the security type information 1321 includes the printing apparatus key method 1322 (YES in step S1508), the processing proceeds to step S1510. When the security type information 1321 does not include the printing apparatus key method 1322 (NO in step S1508), the processing proceeds to step S1509.

In step S1509, the application server unit 4052 acquires the information about the print data 1318, that has received the print instruction from the print data management table 1311 so that the application server unit 4052 causes the encryption management unit 4055 to encrypt the information using the common key of the print server 107. In step S1510, the application server unit 4052 transmits to the printing apparatus 104 the print data, the security type information 1316, and the encryption key identification information 1317.

In step S1511, the security type information 1316 received by the web browser 4032 of the printing apparatus 104 from the print server 107 includes the printing apparatus key method 609 (YES in step S1511), the processing proceeds to step S1512. When the security type information 1316 does not include the printing apparatus key method 609, the processing proceeds to step S1513.

In step S1511, the printing apparatus 104 confirms whether the encryption key identification information 1317 received from the print server 107 corresponds to the encryption key identification information acquired from the encryption management unit 4040 of the printing apparatus 104. When the encryption key identification information 1317 corresponds to the encryption key identification information, the encryption management unit 4040 of the printing apparatus 104 decrypts the print data received from the print server 107 using the secret key of the printing apparatus 104. When the encryption key identification information 1317 does not correspond to the encryption key identification information, the processing ends in error. In step S1513, the printing apparatus 104 performs the print processing on the print data.

As described above, depending on the capacity of the printing apparatus selected by the user, whether to use the public key of the selected printing apparatus or the common key of the print server is determined. By performing the encryption processing and the decryption processing, the security level can be appropriately maintained without deteriorating convenience.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-070320 filed Mar. 25, 2010, which is hereby incorporated by reference herein in its entirety.

What is claimed is:

1. An apparatus comprising:
a reading unit configured to read a document;
a generation unit configured to generate a content data from the document;
an encryption unit configured to perform encryption processing on the content data using an encryption key;
a transmission unit configured to, when an instruction for not using a service for performing processing on the content data provided by a server group and for storing the generated content data in the server group is received, transmit to the server group the content data on which the encryption processing has been performed, and, when an instruction for using the service is received, transmit to the server group the content data on which the encryption processing has not been performed;
a confirmation unit configured to receive from the server group the content data on which the encryption processing has been performed and confirm whether the encryption key used when the encryption processing has been performed on the received data corresponds to a public key produced by the apparatus;
a decryption unit configured to, when the encryption key and the public key correspond to each other, perform decryption processing on the received data using a secret key produced by the apparatus paired with the public key; and
a print unit configured to print the data on which the decryption processing has been performed.

2. The apparatus according to claim 1, wherein, when the instruction for not using the service and storing the content data in the server group is received, the encryption processing is performed on the generated content data.

3. The apparatus according to claim 1, wherein, when the instruction for not using the service and storing the content data in the server group is received, the encryption processing is performed on the generated content data.

4. The apparatus according to claim 2, further comprising:
a display unit configured to display a list of the content data stored by the server group, based on screen information generated based on information about three types of content data, on which the encryption processing has been performed, on which the encryption processing has been performed using the server key, and on which the encryption processing has been performed using the user key corresponding to a user who uses the apparatus; and
an instruction transmission unit configured to transmit to the server group a print instruction for the content data when the content data to be printed is selected from the displayed list of the content data.

5. An apparatus comprising
a reading unit configured to read a document;
a generation unit configured to generate a content data from the document;
an encryption unit configured to perform encryption processing on the content data using an encryption key;
a transmission unit configured to, when an instruction for not using a service for performing processing on the content data provided by a server group and for storing the generated content data in the server group is received, transmit to the server group the content data on which the encryption processing has been performed, and, when an instruction for using the service is received, transmit to the server group the content data on which the encryption processing has not been performed; and
an instruction unit configured to, when two instructions for using the service and for not sharing the content data are received, give to the server group an instruction for performing the encryption processing on the generated content data using a user key corresponding to a user who has given the two instructions, from among encryption keys prepared for each of a plurality of users who have succeeded in authentication performed when using the service provided by the server group, and when two instructions for using the service and for sharing the content data are received, give to the server group an instruction for performing the encryption processing on the generated content using a server key common with a plurality of users who have succeeded in the authentication performed when using the service of the server group.

6. The apparatus according to claim 5 further comprising:
a confirmation unit configured to receive from the server group the content data on which the encryption processing has been performed and confirm whether the encryption key used when the encryption processing has been performed on the received data corresponds to a public key produced by the apparatus;
a decryption unit configured to, when the confirmation unit confirms that the encryption key and the public key correspond to each other, perform decryption processing on the received data using a secret key produced by the apparatus paired with the public key; and
a print unit configured to print the data on which the decryption processing has been performed.

7. The apparatus according to claim 5, wherein, when the instruction for not using the service and storing the content data in the server group is received, the encryption processing is performed on the generated content data.

8. The apparatus according to claim 5, further comprising:
a display unit configured to display a list of the content data stored by the server group, based on screen information generated based on information about three types of content data, on which the encryption processing has been performed, on which the encryption processing has been performed using the server key, and on which the encryption processing has been performed using the user key corresponding to a user who uses the apparatus; and
an instruction transmission unit configured to transmit to the server group a print instruction for the content data when the content data to be printed is selected from the displayed list of the content data.

9. The apparatus according to claims 8,
wherein the content data stored by the server group includes the content data on which the encryption processing has been performed (1) using the server key, (2) using the user key corresponding to the user who uses the image forming apparatus, and (3) using the user key corresponding to a user other than the user who uses the apparatus, and
wherein the screen information is generated excluding the content data that is incapable of being printed.

10. The apparatus according to claim 5, wherein, when the instruction for not using the service and storing the content data in the server group is received, the encryption processing is performed on the generated content data.

11. An image processing system including an apparatus and a server group, the apparatus comprising:
a reading unit configured to read a document;
a generation unit configured to generate the content data from the document;
an encryption unit configured to perform encryption processing on the content data using an encryption key; and
a transmission unit configured to, when an instruction for not using the service for performing the processing on the content data provided by the server group and storing the generated content data in the server group is received, transmit to the server group the content data on which the encryption processing has been performed, and, when an instruction for using the service and storing the generated content data in the server group is received, transmit to the server group information about the encryption key according to the instruction and the content data on which the encryption processing has not been performed, and the server group comprising:
a control unit configured to control processing for, when the encryption processing is performed on the content data transmitted by the transmission unit, storing the content data, and, when the encryption processing is not performed based on the information of the encryption key, specifying the encryption key from a plurality encryption keys that have previously stored to be used when the encryption processing is performed, performing the encryption processing on the content data on which the encryption processing has not been performed using the specified encryption key, and storing the encrypted content data.

12. A method for controlling a system including an apparatus and a server group, the method comprising:
reading a document;
generating a content data from the document;
performing encrypting processing on the content data using an encryption key;
when an instruction for not using a service for performing the processing on the content data provided by the server group and storing the generated content data in the server group is received, transmitting to the server group the content data on which the encryption processing has been performed, and, when an instruction for using the service and for storing the generated content in the server group is received, transmitting to the server group information about the encryption key according to the instruction and the content data on which the encryption processing has not been performed; and
performing control at the server group, when the encryption processing is performed on the content data, to store the content data, and, when the encryption processing is not performed on the content data, based on the information about the encryption key, to specify the encryption key of the encryption keys that have previously stored, to be used when the encryption processing is performed, to perform the encryption processing on the content data on which the encryption processing has not been performed using the specified encryption key, and to store the encrypted content data.

13. The method according to claim 12 further comprising:
receiving from the server group the content data on which the encryption processing has been performed and confirming whether the encryption key used when the encryption processing has been performed on the received data corresponds to a public key produced by the apparatus;
performing decryption processing on the received data using a secret key produced by the apparatus paired with the public key when the encryption key and the public key correspond to each other; and
printing the data on which the decryption processing has been performed.

14. The method according claim 12, further comprising:
providing to the server group an instruction for performing the encryption processing on the generated content data using a user key corresponding to a user who has given the two instructions, from among encryption keys prepared for each of a plurality of users who have succeeded in authentication performed when using the service provided by the server group; and
providing to the server group an instruction for performing the encryption processing on the generated content using a server key common with a plurality of users who have succeeded in the authentication performed when using the service of the server group when two instructions for using the service and for not sharing the content data are received, and when two instructions for using the service and for sharing the content data are received.

15. The method according to claim 12, further comprising performing encryption processing on generated content data when the instruction for not using the service and storing the content data in the server group is received.

16. A non-transitory computer readable storage medium storing a program that is executable to perform a method comprising:
reading a document;
generating a content data from the read document;
encrypting the content data using an encryption key;
transmitting to the server group the content data on which the encryption processing has been performed by encrypting when an instruction for not using a service for performing the processing on the content data provided by a server group and storing the generated content data in the server group is received, and transmitting to the server group the content when an instruction for using the service for performing the processing on the content data provided by the server group is received;

receiving from the server group the content data on which the encryption processing has been performed and confirming whether the encryption key used when the encryption processing has been performed on the received data corresponds to a public key produced by the apparatus;

performing decryption processing on the received data using a secret key produced by the apparatus paired with the public key when the encryption key and the public key correspond to each other; and printing the data on which the decryption processing has been performed.

17. The non-transitory computer readable storage medium according to claim 16, further comprising performing encryption processing on generated content data when the instruction for not using the service and storing the content data in the server group is received.

18. A non-transitory computer readable storage medium storing a program that is executable to perform a method comprising:

reading a document;

generating a content data from the read document;

encrypting the content data using an encryption key;

transmitting to the server group the content data on which the encryption processing has been performed by encrypting when an instruction for not using a service for performing the processing on the content data provided by a server group and storing the generated content data in the server group is received, and transmitting to the server group the content when an instruction for using the service for performing the processing on the content data provided by the server group is received;

providing to the server group an instruction for performing the encryption processing on the generated content data using a user key corresponding to a user who has given the two instructions, from among encryption keys prepared for each of a plurality of users who have succeeded in authentication performed when using the service provided by the server group; and providing to the server group an instruction for performing the encryption processing on the generated content using a server key common with a plurality of users who have succeeded in the authentication performed when using the service of the server group when two instructions for using the service and for not sharing the content data are received, and when two instructions for using the service and for sharing the content data are received.

19. The non-transitory computer readable storage medium according to claim 18, further comprising performing encryption processing on generated content data when the instruction for not using the service and storing the content data in the server group is received.

* * * * *